United States Patent [19]
Haruyama

[11] Patent Number: 5,886,273
[45] Date of Patent: Mar. 23, 1999

[54] PERFORMANCE INSTRUCTING APPARATUS

[75] Inventor: Kazuo Haruyama, Hamamatsu, Japan

[73] Assignee: Yamaha Corporation, Hamamatsu, Japan

[21] Appl. No.: 857,445

[22] Filed: May 16, 1997

[30] Foreign Application Priority Data

May 17, 1996 [JP] Japan .................................. 8-146456

[51] Int. Cl.$^6$ .................................................. G09B 15/08
[52] U.S. Cl. ............................................................ 84/478
[58] Field of Search ........................... 84/470 R, 477 R, 84/478

[56] References Cited

U.S. PATENT DOCUMENTS 5,085,116  2/1992  Nakata et al. .
5,286,909  2/1994  Shibukawa .
5,574,238  11/1996  Mencher ............................... 84/478 X Primary Examiner—William M. Shoop, Jr.
Assistant Examiner—Jeffrey W. Donels
Attorney, Agent, or Firm—Graham & James LLP

[57] ABSTRACT

A performance instructing apparatus is provided which reproduces a music piece according to automatic performance data, and displays a drawing of a display keyboard that is oriented in the same direction as a keyboard through which a player enters pitch information, and a key operation region corresponding to each key of the display keyboard. The key operation region represents a period from a point of time when the key is to be depressed by the player to a point of time when the key is to be released. The key operation region is scrolled such that the region approaches the display keyboard as the music piece is reproduced.

32 Claims, 18 Drawing Sheets

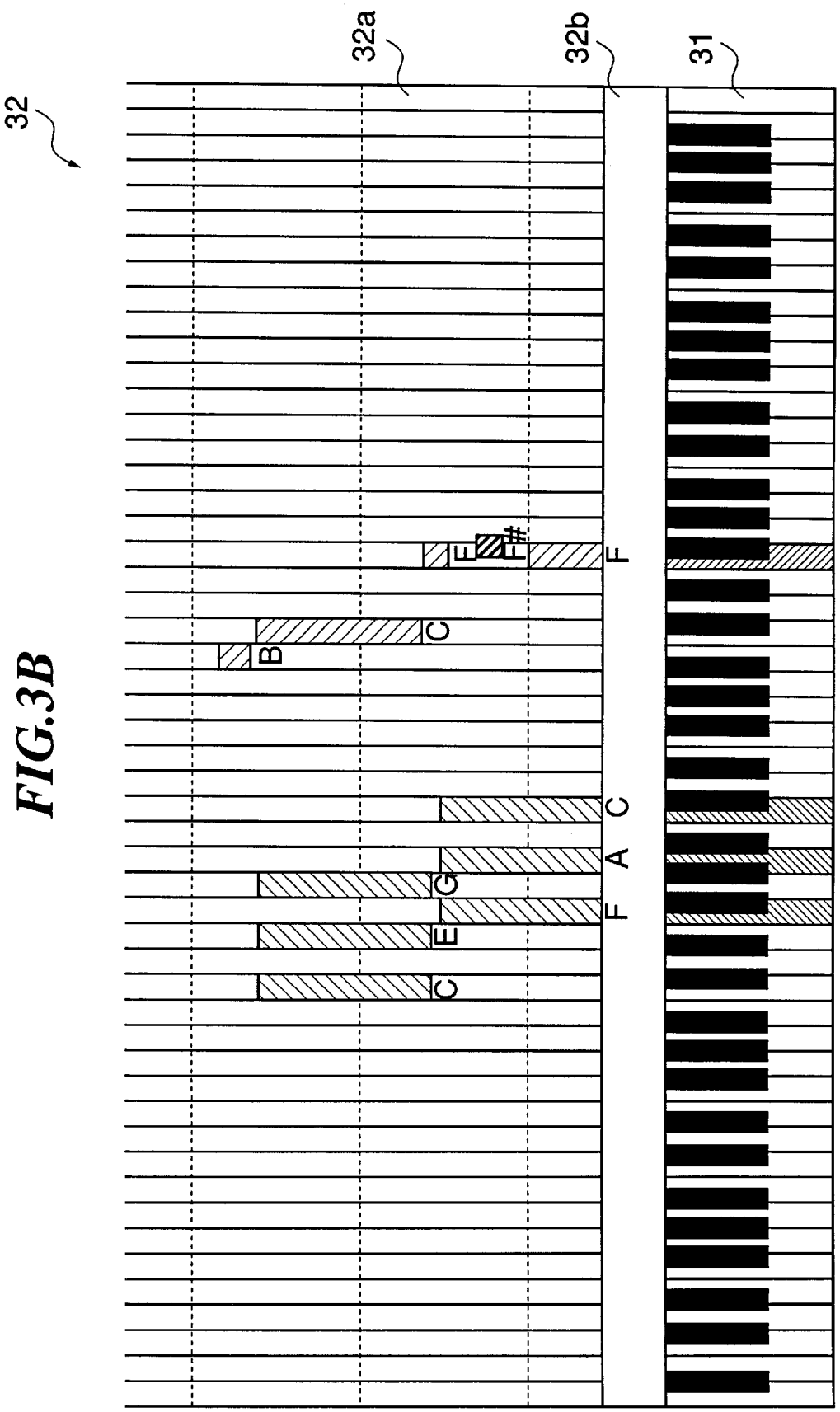

FIG.14A

BUFFER 1

| | KC | ELAPSED TIME(KC) |
|---|---|---|
| 1 | KC | ELAPSED TIME(KC) |
| ⋮ | ⋮ | ⋮ |
| 32 | KC | ELAPSED TIME(KC) |

FIG.14B

BUFFER 2

| | KC | ELAPSED TIME(KC) |
|---|---|---|
| 1 | KC | ELAPSED TIME(KC) |
| ⋮ | ⋮ | ⋮ |
| 32 | KC | ELAPSED TIME(KC) |

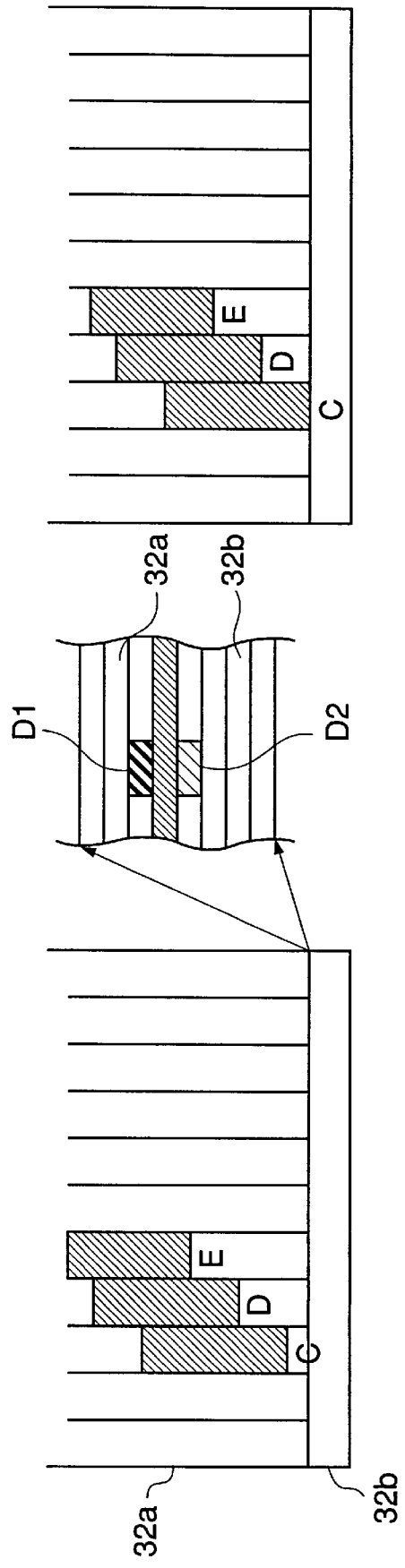

NOTE ON/OFF SINGLE SPEED

BAR-LINE SINGLE SPEED

NOTE ON/OFF DOUBLE SPEED

BAR-LINE DOUBLE SPEED

PERFORMANCE INSTRUCTING APPARATUS

BACKGROUND OF THE INVENTION

1. Field of the Invention

The present invention relates to a performance instructing apparatus provided with a key-depression instructing function for instructing the timing in which a key should be depressed (or released), and a performance guidance function provided concurrently with performance by a player, for determining the coincidence of instructions on the key depression with key-depressing actions actually made by the player.

2. Prior Art

Conventionally, a performance instructing apparatus having a key-depression instructing function and a performance guidance function is known wherein a light-emitting diode (LED) (keyboard LED) provided for each key on a keyboard of an instrument is turned on as automatic performance data representing a song or a tune is reproduced, so as to inform a player of the timing when the key should be depressed. This conventional apparatus is also able to determine the coincidence of the key-depression instructed by the LED with an actual key-depressing action by the player.

Another type of performance instructing apparatus is known wherein a keyboard is displayed with a musical score displayed on a display by means of a sequencer using a personal computer, for example, such that the keyboard is oriented in the vertical direction of the display, namely, in the direction to which the actual keyboard is rotated 90 degrees counterclockwise, and wherein a lateral (horizontal) bar corresponding to each key to be depressed is also displayed at a position indicating the timing of the key-depression, such that the length of the lateral bar represents a period from the key depression to the key release.

Although the above-described conventional performance instructing apparatus is able to direct the current key depression and the next key depression, it is difficult for this apparatus to display the following key depressions, namely, display how the song or tune will proceed in the near future. Thus, the player guided by this apparatus is not able to grasp the flow of the song or tune.

Since the keyboard on the display is not displayed in the same direction as the keyboard actually played by the player in the conventional sequencer, the player must instantly associate a key on the display with a corresponding key on the keyboard to be actually played during the performance of the song displayed, which is difficult for a beginner, in particular.

SUMMARY OF THE INVENTION

It is therefore an object of the present invention to provide a performance instructing apparatus that enables even a beginner to instantly determine a key or keys to be depressed while grasping the flow of a song or a tune, thereby assuring increased easiness with which the apparatus is operated.

To attain the above object, there is provided a performance instructing apparatus comprising music piece-reproducing means for reproducing a music piece according to automatic performance data, display means for displaying a drawing of a display keyboard that is oriented in the same direction as a keyboard through which a player enters pitch information, and for displaying a key operation region corresponding to each key of the display keyboard, the key operation region representing a period from a point of time when the each key is to be depressed by the player to a point of time when the each key is to be released by the player, and scroll means for scrolling the key operation region such that the region approaches the display keyboard as the music piece is reproduced by the music piece-reproducing means.

In the performance instructing apparatus constructed as described above, the display means displays the drawing of the display keyboard in the same direction as the keyboard through which the player enters pitch information, and also displays a key operation region for each key on the display keyboard, such that the key operation region represents a period from the time when the key should be depressed by the player to the time when the key should be released. Since the key operation regions are scrolled so as to approach the display keyboard as the music piece is reproduced by the music piece reproducing means, the player can grasp or understand the flow of the music piece, and even a beginner is able to instantly determine a key or keys to be depressed. Thus, the apparatus of the present invention can be operated with increased easiness.

In one preferred form of the invention, the performance instructing apparatus further includes key display mode-changing means for changing a display mode in which each key is displayed, when the key operation region reaches the corresponding key of the display keyboard.

Since the display mode is changed when the displayed key operation region reaches the corresponding key on the display keyboard in the above preferred form of the invention, the visibility of key operations is improved, and therefore a high performance aid effect can be obtained.

In another preferred form of the invention, the performance instructing apparatus further includes key correctness-determining means for comparing a pitch of a key that is depressed by the player on the keyboard, with a pitch of the automatic performance data that are being reproduced, and for determining whether the pitch of the key depressed by the player coincides with the pitch of the automatic performance data. In this apparatus, the key display mode-changing means changes the display mode depending upon a result of the determination by the key correctness-determining means.

In the above preferred form of the invention, when the player depresses a key on the keyboard, the pitch of the depressed key is compared with the pitch of a key code in a currently reproduced part of the automatic performance data, so as to determine the correctness of the key depression, and the display mode is changed depending upon the result of the determination. Accordingly, the player can get a feedback on his/her performance, to obtain an improved effect of practice of the music piece.

In a further preferred form of the invention, the performance instructing apparatus further includes syllable-name/pitch-name display means for displaying at least one of a syllable name and a pitch name of each key in the vicinity of the corresponding key operation region.

Since the syllable name and/or pitch name of a key corresponding to each key operation region is displayed in the vicinity of the key operation region in the above preferred form of the invention, the visibility of key operation can be further improved, and a still higher performance aid effect can be obtained.

In a still further preferred form of the invention, the performance instructing apparatus further includes pausing means for temporarily stopping reproduction of the music piece by the music piece-reproducing means and scrolling of the key operation area by the scroll means, if the player fails to depress a key corresponding to the key operation area displayed by the display means when the key operation area has reached the corresponding key of the display keyboard, the pausing means pausing the reproduction and the scrolling until the player depresses the key.

In the above preferred form of the invention, where the player fails to depress a key corresponding to the currently displayed key operation area when the key operation region has reached the corresponding key on the display keyboard, the reproduction of the music piece and the scrolling of the key operation area are temporarily stopped (paused) until the relevant key is depressed by the player. This arrangement can further improve the effect of practice of the music piece.

In another preferred form of the invention, the performance instructing apparatus further includes key operation region display mode-changing means for changing a display mode in which the key operation region is displayed, depending upon a type of the key corresponding to the key operation region.

In a further preferred form of the invention, the performance instructing apparatus further includes key operation region display mode-changing means for changing a display mode in which the key operation region is displayed, depending upon whether the each key corresponding to the key operation region is to be depressed by a right hand or a left hand of the player.

Since the display mode of the displayed key operation region is changed depending upon the type of the key corresponding to the key operation region or depending upon whether the each key corresponding to the key operation region is to be depressed by a right hand or a left hand of the player in the above preferred form of the invention, the visibility of the key operation can be further improved, and therefore an even higher performance aid effect can be obtained.

In a preferred form of the invention, the performance instructing apparatus further includes operation region display mode-changing means for changing a display mode in which the key operation region is displayed, depending upon a type of the automatic performance data, preferably, depending upon velocity included in event data of the automatic performance data.

Since the display mode of the displayed key operation region is changed depending upon a type of the automatic performance data, preferably, depending upon velocity included in event data of the automatic performance data in the above preferred form of the invention, the visibility of the key operation can be further improved, and therefore an even higher performance aid effect can be obtained.

In a still another preferred form of the invention, the music piece-reproducing means produces key-depression events relating to depression of keys and timing-line events representing a particular timing of performance, as the music piece is reproduced by the music piece reproducing means, and the display means comprises a display area including a predetermined number of minimum display units. The display means displays a key depression region as the key operation region upon occurrence of each of the key-depression events, and a timing line upon occurrence of each of the timing-line events. The scroll means displays the key depression region in a first display mode in M pieces of the minimum display units located in an end portion of the display area, upon occurrence of each key-depression event during reproduction of the music piece by the music piece-reproducing means, and displays the timing line in a second display mode in at least one (N) of said M pieces of the minimum display units, upon occurrence of said each timing-line event during reproduction by the music piece reproducing means, while displaying the rest of said M pieces of the minimum display units in the first display mode. The scroll means shifts a predetermined display region including the above end portion by an amount corresponding to the M pieces of the minimum display units per unit time and copying data in the predetermined display region into a region to which the predetermined display region is scrolled, and rewrites the at least one (N) of the plurality of the minimum display units in the end portion, in the display mode of the minimum display units that exclude the one or more (N) of the minimum display units.

In the above preferred form of the invention, the process time needed for the scrolling process can be advantageously reduced.

Preferably, the performance instructing apparatus as described just above further includes number changing means for changing the number of the M pieces of the minimum display units. This arrangement can avoid delays in display by the display means, which may occur when it takes too much time to perform the scroll process and other various processes.

To attain the above object, the present invention also provides a machine readable storage medium storing a program for instructing execution of a performance instructing method comprising a music piece-reproducing step of reproducing a music piece according to automatic performance data, a display step of displaying a drawing of a display keyboard that is oriented in the same direction as a keyboard through which a player enters pitch information, and for displaying a key operation region corresponding to each key of the display keyboard, the key operation region representing a period from a point of time when the each key is to be depressed by the player to a point of time when the each key is to be released by the player, and a scroll step of scrolling the key operation region such that the region approaches the display keyboard as the music piece is reproduced by the music piece-reproducing step.

To attain the above object, the present invention also provides a performance instructing method comprising a music piece-reproducing step of reproducing a music piece according to automatic performance data, a display step of displaying a drawing of a display keyboard that is oriented in the same direction as a keyboard through which a player enters pitch information, and for displaying a key operation region corresponding to each key of the display keyboard, the key operation region representing a period from a point of time when the each key is to be depressed by the player to a point of time when the each key is to be released by the player, and a scroll step of scrolling the key operation region such that the region approaches the display keyboard as the music piece is reproduced by the music piece-reproducing step.

To attain the above object, the present invention also provides a performance instructing apparatus comprising a music piece-reproducing device which reproduces a music piece according to automatic performance data, a display which displays a drawing of a display keyboard that is oriented in the same direction as a keyboard through which a player enters pitch information, and displays a key operation region corresponding to each key of the display keyboard, the key operation region representing a period from a point of time when the each key is to be depressed by the player to a point of time when the each key is to be released by the player, and a controller which controls the display to scroll the key operation region such that the region approaches the display keyboard as the music piece is reproduced by the music piece-reproducing device.

To attain the above object, the present invention further provides a performance instructing apparatus comprising a music piece-reproducing device which reproduces a music piece according to automatic performance data, a display which displays a drawing of a display keyboard that is oriented in the same direction as a keyboard through which a player enters pitch information, and displays a key operation point corresponding to each key of the display keyboard, the key operation point representing timing in which the each key is to be operated by the player, and a controller which controls the display to scroll the key operation point such that the point approaches the display keyboard as the music piece is reproduced by the music piece-reproducing device.

The above and other objects, features, and advantages of the invention will become more apparent from the following detailed description taken in conjunction with the accompanying drawings.

BRIEF DESCRIPTION OF THE DRAWINGS

FIG. 3B is a view showing another display state that appears after a given time period elapses from the display state of FIG. 3A;

FIG. 14A is a view of showing a format of data stored in a buffer 1;

FIG. 14B is a view showing a format of data stored in a buffer 2;

FIGS. 15A to 15C are views useful in explaining steps S102 through S105 in FIG. 11;

DETAILED DESCRIPTION OF THE PREFERRED EMBODIMENT

The invention will now be described in detail with reference to the drawings showing an embodiment thereof.

Figure 1:
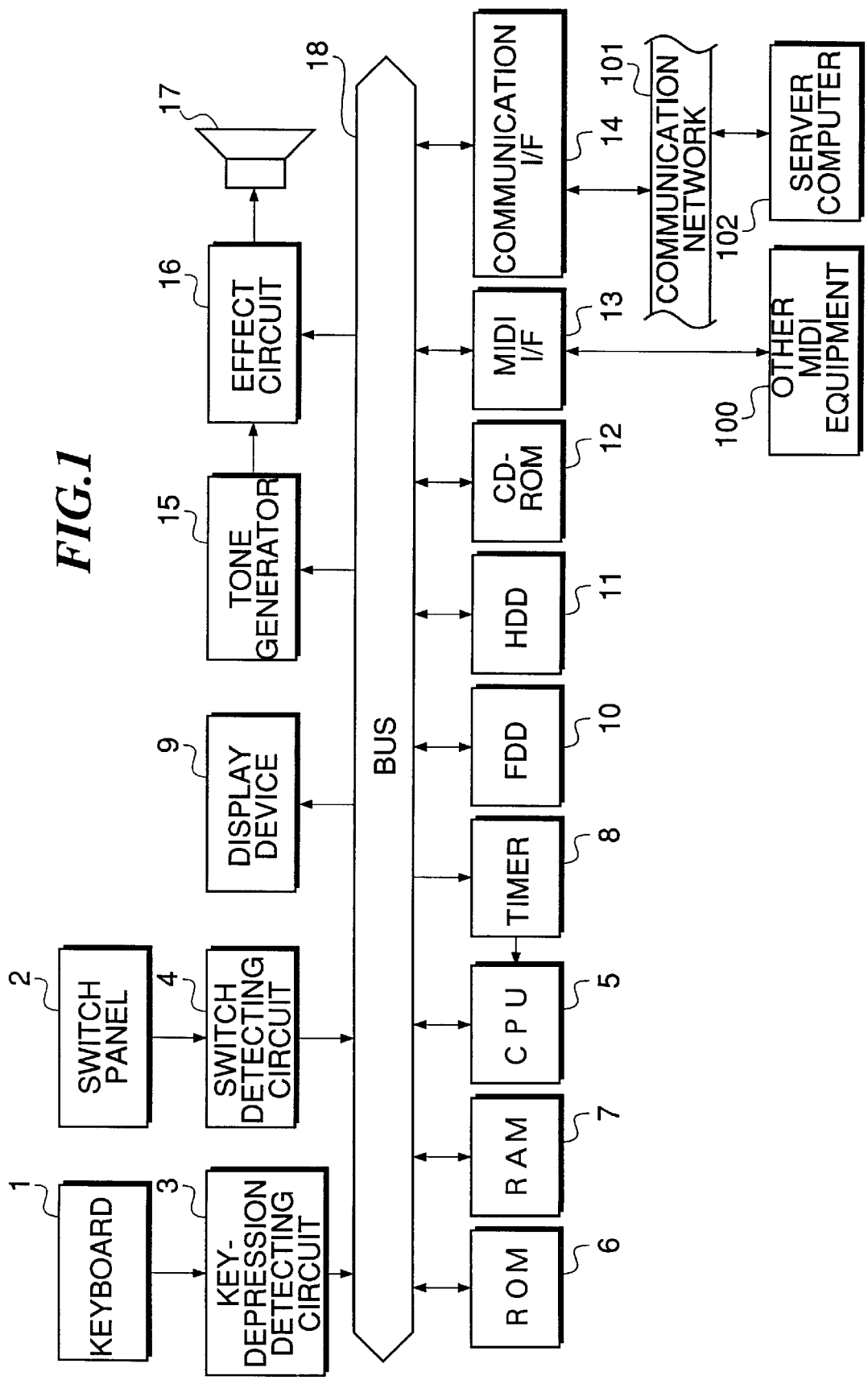
FIG. 1 is a block diagram schematically showing the construction of an electronic instrument according to one embodiment of the invention.

Referring first to FIG. 1, there is schematically illustrated the schematic construction of an electronic keyboard instrument which employs a performance instructing apparatus according to a preferred embodiment of the invention.

As shown in FIG. 1, the electronic keyboard instrument of the present embodiment includes a keyboard 1 for entering pitch information, switch panel or switch board 2 including a plurality of switches for entering various kinds of information, a key-depression detecting circuit 3 for detecting the depressed state of each key on the keyboard 1, a switch detecting circuit 4 for detecting the operated state of each switch on the switch panel 2, a CPU 5 that governs control of the whole apparatus, a ROM 6 that stores control programs to be executed by the CPU 5, table data and others, a RAM 7 that temporarily stores automatic performance data, various kinds of input information, operation results and others, a timer 8 for counting interrupt time in a timer interrupt routine and various other time periods, and a display device 9 that displays various kinds of information and includes a large-sized LCD or CRT, and LEDs and others, for example. The electronic keyboard instrument also includes a floppy disc drive (FDD) 10 for driving a floppy disc (FD) as a storage medium, a hard disc drive (HDD) 11 as an external memory device storing various application programs including the above control programs, various data and the like, a CD-ROM drive 12 for driving a compact-disc read only memory (CD-ROM) that stores various application programs including the control programs, various data and the like, a MIDI interface (I/F) 13 which receives MIDI (Musical Instrument Digital Interface) signals from an external device, or generates the MIDI signals to the external device, and a communication interface (I/F) 14 through which data are received from and transmitted to a server computer 102, for example, through a communication network 101. The electronic keyboard instrument further includes a tone generator circuit 15 that converts performance data entered through the keyboard 1, automatic performance data and others, into musical tone signals, an effect circuit 16 for giving various effects to the musical tone signals received from the tone generator circuit 15, and a sound system 17, such as a loudspeaker, for converting the musical tone signals received from the effect circuit 16 into sound.

The constituent elements 3–16 described above are connected to each other through a bus 18, and the timer 8 is connected to the CPU 5. Other MIDI equipment 100 is connected to the MIDI I/F 13, and the communication network 101 is connected to the communication interface (I/F) 14. Further, the effect circuit 16 is connected to the tone generator circuit 15, and the sound system 17 is connected to the effect circuit 16.

The HDD 11 stores control programs to be performed by the CPU 5 as described above. Where the control programs are not stored in the ROM 6, the control programs are stored in a hard disc in this HDD 11, and the thus stored programs are read into the RAM 7 so that the CPU 5 can perform substantially the same operations as in the case where the control programs are stored in the ROM 6. This arrangement facilitates addition of control programs and upgrading of the version of the programs.

Control programs and various data read from the CD-ROM in the CD-ROM drive 12 are stored in the hard disc within the HDD 11. This makes it easy to install new control programs and upgrade the version of the programs, for example. In addition to the CD-ROM drive 12, various other devices, such as an magneto-optical disc (MO) drive, which utilize various forms of media may be provided as external memory devices.

As described above, the communication I/F 14 is connected to the communication network 101, such as a LAN (local area network), Internet and telephone line, and is connected to the server computer 102 through the communication network 101. Where some kinds of programs or parameters are not stored in the hard disc drive 11, the communication I/F 14 may be used for downloading desired programs and parameters from the server computer 102. A client computer (electronic instrument of the present embodiment) transmits commands to the server computer 102 through the communication I/F 14 and communication network 101, so as to request downloading of the desired programs and parameters. The server computer 102 receives the commands and delivers the requested programs and parameters to the client computer through the communication network 101, and the computer receives these programs and parameters, through the communication I/F 101, and stores them in the hard disc drive 11. In this manner, the downloading operation is completed.

In addition, another interface may be provided for directly transmitting and receiving data to and from an external computer or the like.

Figure 2:
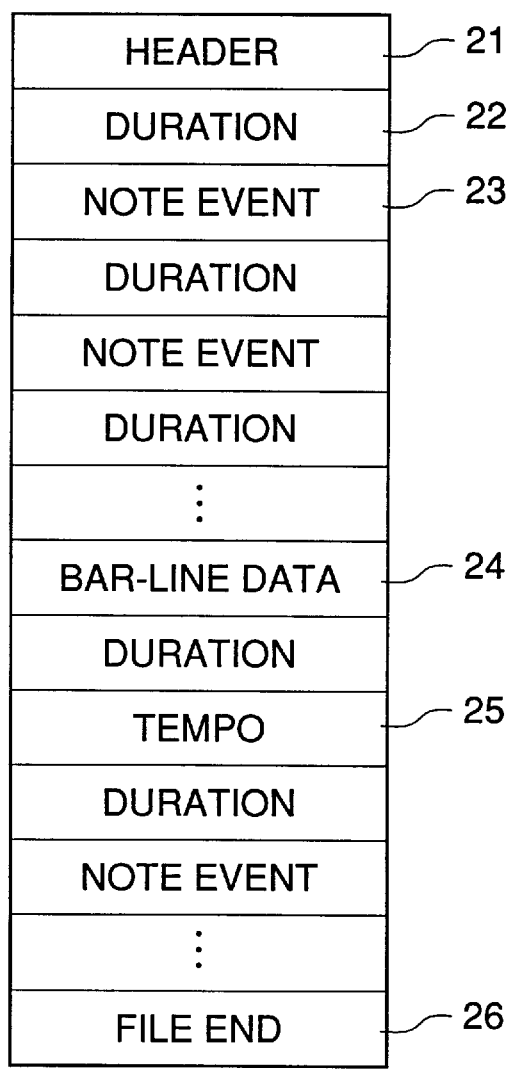
FIG. 2 is a view showing a data format of performance data.

FIG. 2 shows the format of the above-indicated automatic performance data.

As shown in FIG. 2, the automatic performance data principally consists of header data 21, duration data 22, note event data 23, bar-line data 24, tempo data 26, and file end data 26.

The header data 21 represent data stored at the head of the automatic performance data. In the present embodiment, a song or tune title, an initial tempo and other data are stored as the head data 21.

The duration data 22 are time data representing time intervals between event data (note event data 23, bar-line data 24 and tempo data 26 in this embodiment).

The note event data 23 denote two kinds of data, namely, note-on event data and note-off event data. The note-on event data consists of such data as note-on, MIDI channel, note number, and velocity. The note-off event data consists of such data as note-off, MIDI channel and note number. The MIDI channel consists of 16 channels, for example, wherein channels 1 and 2 are respectively allotted to right-hand data and left-hand data, and other channels are allotted to event data for accompaniment. In this connection, the channels 1 and 2 denote MIDI channels that are allotted to note event data for guiding performance, and the right-hand data denote note event data to be played with the right hand of a player, while the left-hand data denote note event data to be played with the left hand of the player. Each of the note event data is stored with the MIDI channel because, in the present embodiment, the note event data 23 are stored such that they are arranged in a single row in the order of outputting regardless of the kind of each event, and, when a particular data 23 is actually read out and processed, the kind of the event is determined based on the MIDI channel stored with the particular data so that the data representing the note event is processed according to the result of the determination.

While the note-off event data do not include the velocity in the present embodiment, it is needless to say that the note-off event data may include the velocity.

The bar-line data 24 denote data representing a bar-line, and the tempo data 25 denote data for changing the tempo. The file end data 26 denote data indicating the end of the file, namely, the end of the automatic performance data.

Although the actual automatic performance data include other data than the above-described data, such other data are not essential for explaining the present invention, and thus description thereof is omitted.

While the event data are stored such that they are arranged in a single row in the order of outputting regardless of the MIDI channels allotted to the event data, the present invention is not limited to this form of data storage. For example, tracks corresponding to the respective MIDI channels may be provided, and each track may be allotted to the corresponding kind of event data. In this arrangement, each kind of the note event data need not be stored with the MIDI channel as described above, but the memory capacity will be increased.

In the present embodiment, the data format of the automatic performance data is constructed in the form of "event data+duration data" as described above. The data format used in the present invention is not limited to this form, but may be any format, such as "event data+relative time data", "event data+absolute time data" or "pitch data+note length data".

Figure 3A:
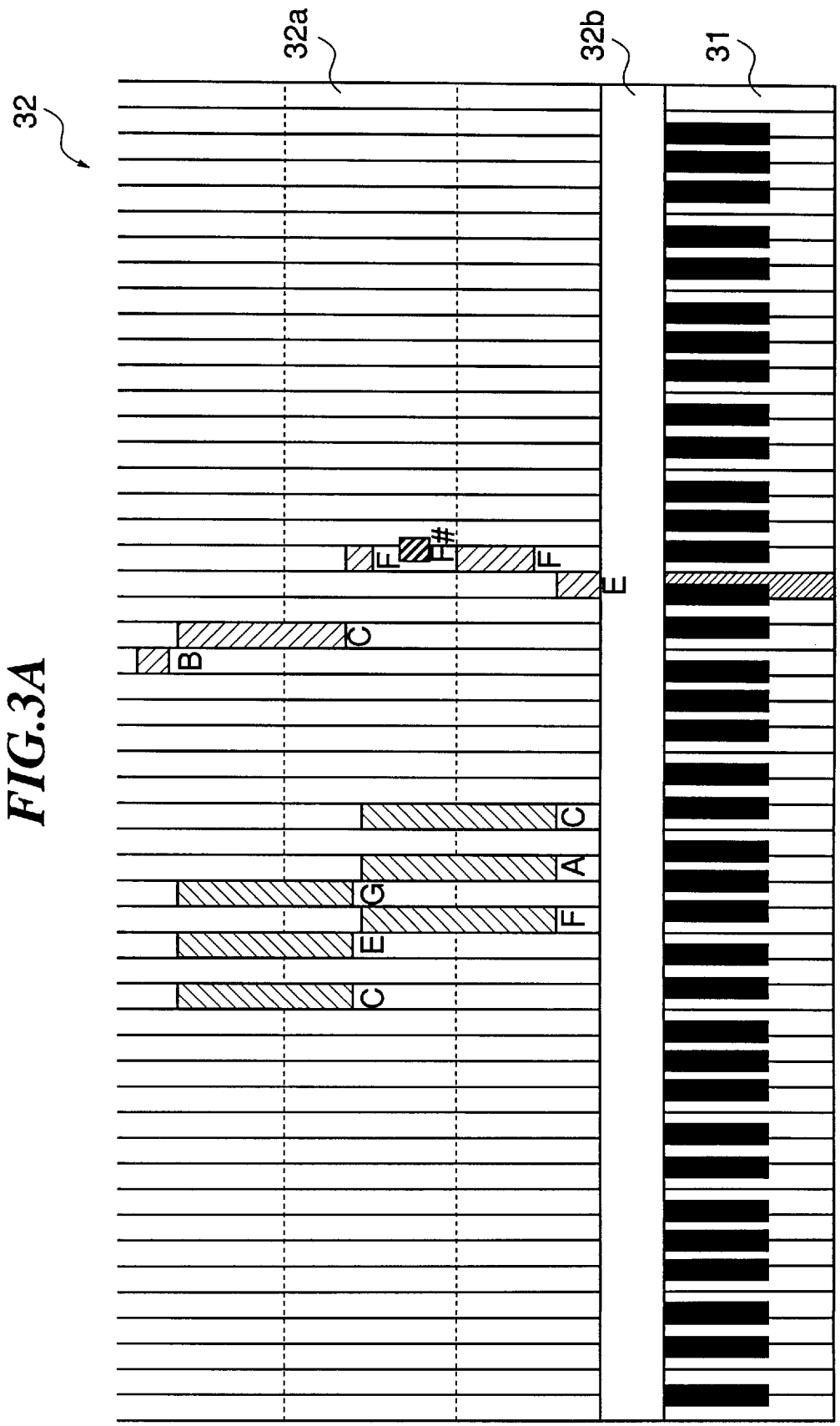
FIG. 3A is a view showing one display state at a certain point of time provided on a display device in FIG. 1.

FIGS. 3A and 3B show one example of display provided on the above-indicated display device 9. As shown in the figures, a miniature display keyboard 31 that represents the keyboard 1 when it is looked down by the player, and a region in the form of a piano roll paper (which region will be hereinafter referred to as "the piano roll paper") that represents keys to be operated and the operating timing of the keys. FIG. 3A shows one display state at a certain point of time, and FIG. 3B shows another display state that appears after a given time period elapses from the display state of FIG. 3A.

The miniature display keyboard 31 is a display in which the keyboard 1 as viewed by the player when he/she faces the keyboard 1 is shown in a reduced size. Similarly to the keyboard 1, eighty-eight keys are provided in the miniature display keyboard 31.

On the piano roll paper 32, vertical bars are displayed so as to represent key operation periods, namely, periods or time lengths from the time of key depression to the time of key release. The piano roll paper 32 consists of a scroll area 32a in which the vertical bars scroll as the reproduction of the automatic performance data proceeds, and a syllable-name/pitch-name display area 32b in which is displayed the syllable name or pitch name of a key (or keys) corresponding to a scrolling vertical bar whose lower end has disappeared from the scroll area 32 but whose upper end still remains in the scroll area 32. The syllable name or pitch name of the key is kept displayed until the upper end of the vertical bar disappears from the scroll area 32. In the example of FIGS. 3A, 3B, the pitch names of keys corresponding to such vertical bars are displayed in the syllable-name/pitch-name display area 32b. The "vertical bar" will be hereinafter referred to as "the scroll bar".

The scroll area 32a is equally divided into a plurality of elongate regions having the same width, such that the number of these regions is equal to that of white keys on the miniature display keyboard 31. Where a key to be operated is a white key, the above-indicated scroll bar is displayed in the region corresponding to the white key, at a vertical position that indicates the timing of the operation of the key (key depression and key release). Where a key to be operated is a black key, the scroll bar is displayed in a portion that overlaps two adjacent white keys on both sides of the black key, as in the actual keyboard 1, namely, in a portion that overlaps two adjacent regions corresponding to the above two adjacent white keys. The vertical position of the scroll bar indicates the timing of the operation of the key (key depression and key release).

The scroll bars are displayed with different colors with respect to left-hand data and right-hand data. For example, the scroll bars corresponding to left-hand data are colored green, while those corresponding to right-hand data are colored yellow. The scroll bars are also displayed in different display forms or styles with respect to black keys and white keys, respectively. For example, the scroll bars corresponding to black keys have relatively dark color, while those corresponding to white keys have relatively light color. Further, the syllable name or pitch name of each key is displayed in white below the corresponding scroll bar. In FIGS. 3A and 3B on which actual display colors cannot be expressed, display forms (namely, the orientation and thickness of lines in hatched areas) are varied so as to represent different colors.

As described above, when the syllable name or pitch name displayed below each scroll bar is lowered below the scroll area 32*a*, the syllable name or pitch name is displayed in the pitch name/syllable name display area 32*b* until the scroll bar completely disappears from the scroll area 32*a*. From the time when the lower end of the syllable name or pitch name reaches the lower edge of the scroll area 32*a* until the time when the upper end of the syllable name or pitch name disappears from the scroll area 32*a*, the syllable name or pitch name scrolls from the scroll area 32*a* to the syllable-name/pitch-name display area 32*b*. When the syllable name or pitch name completely disappears from the scroll area 32*a*, but the scroll bar is still displayed in the scroll area 32, the syllable name or pitch name is stopped and displayed at a given position in the syllable-name/pitch-name display area 32*b*. The syllable name or pitch name is displayed in white when it exists in the scroll area 32*a*, as described above, and is displayed in purple, for example, when it exists in the syllable-name/pitch-name display area 32*b*.

The timing in which the player should depress a certain key is when the lower end of the scroll bar corresponding to the key reaches the lower edge of the scroll area 32*a*, i.e., the boundary between the scroll area 32*a* and the syllable-name/pitch name display area 32*b*. At this time, the key on the miniature display keyboard 31 that is to be depressed is colored so that it has the same color as the scroll bar. When the player depresses the corresponding key on the keyboard 1 in response to this display, the color of the key on the miniature display keyboard 31 is changed into blue, for example. If the player depresses a wrong key, the color of the key on the miniature display keyboard 31 that is depressed is changed into red, for example.

Figure 4:
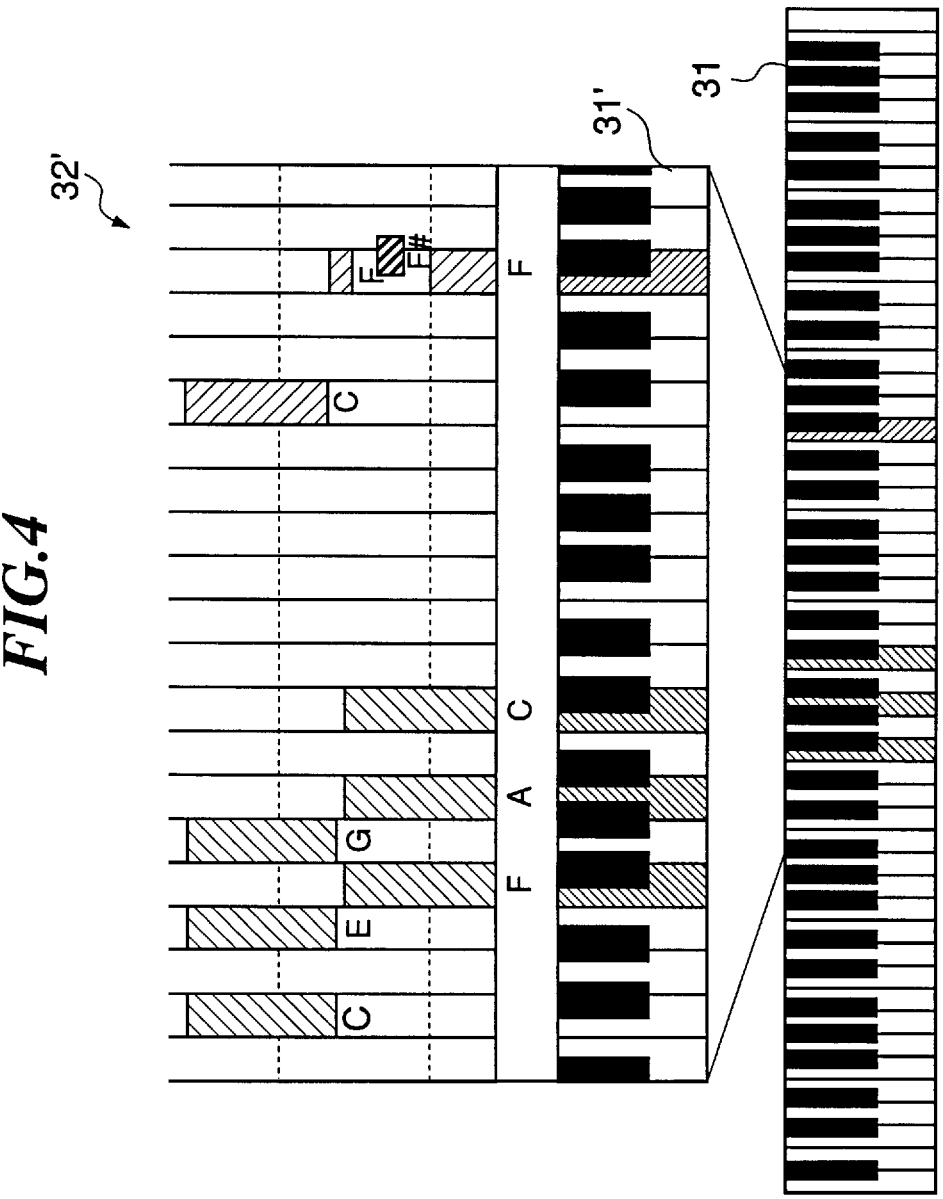
FIG. 4 is a view showing one example in which a piano roll paper in FIG. 3 is displayed on an enlarged scale.

FIG. 4 shows one example of display on the display device 9 when an enlarged display mode is selected by the player. As shown in the figure, a range (key region) of a given number of consecutive keys (21 white keys in the present embodiment) is selected from the miniature display keyboard 31, and this key region is displayed in enlargement such that the size of each key on the display keyboard 31 becomes substantially equal to the size of each key on the actual keyboard 1. Thus, an enlarged keyboard 31' in the selected key region and an enlarged piano roll paper 32' in the same range are displayed, and the miniature display keyboard 31 is also displayed in the same form as it is displayed in FIG. 3. With the miniature display keyboard 31 thus displayed as well as the enlarged display, the player is well informed of which portion of the keyboard 1 corresponds to the selected key region, and is thus able to instantly get the idea of which key or keys should be depressed. As described later in detail, a given number of automatic performance data in the guide tracks to be read are read in advance, and an optimum range is selected as the key region based on the result of the advance reading, namely, such a range that includes all pitches of the note event data in the thus read automatic performance data is selected as the key region.

Referring next to FIG. 5 through FIG. 16, there will now be described control routines executed by the electronic keyboard instrument constructed as described above.

Figure 5:
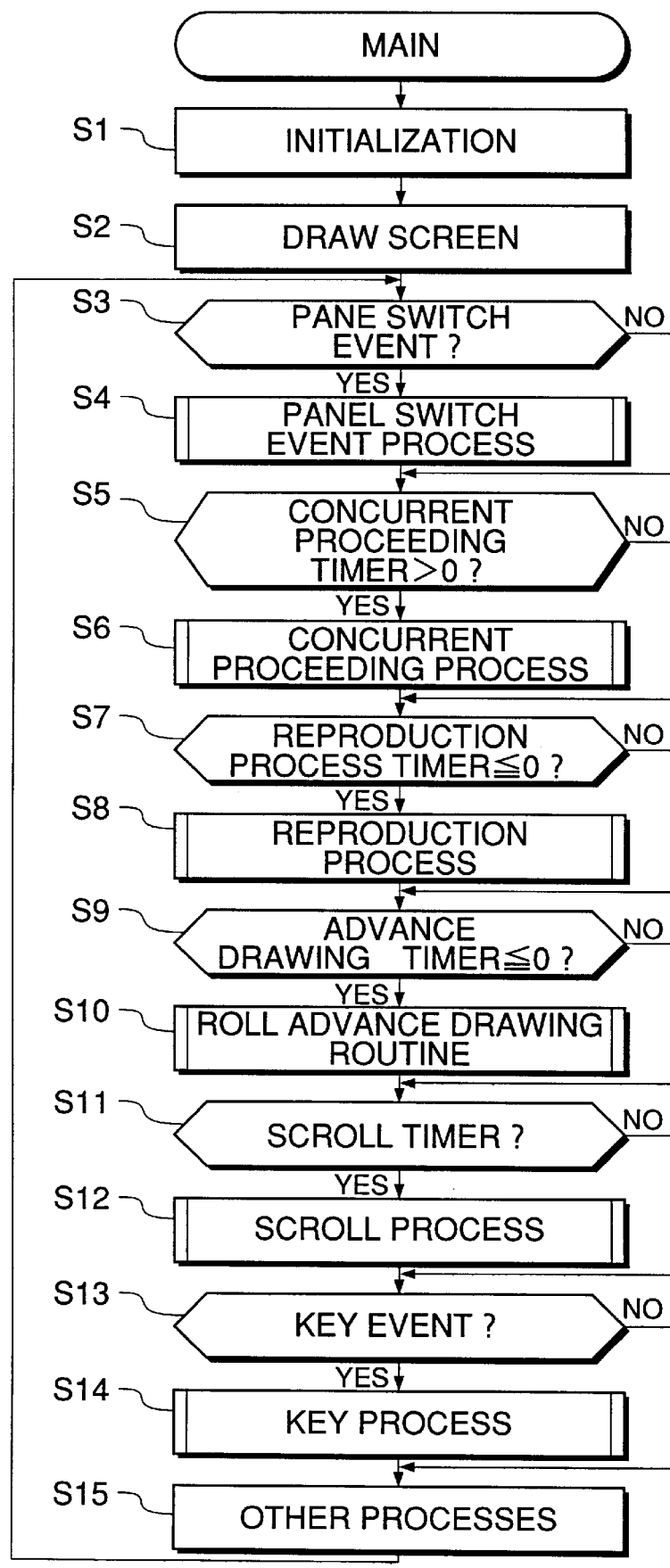
FIG. 5 is a flowchart showing the flow of a main routine executed by the electronic instrument of FIG. 1, more particularly, by a CPU thereof.

FIG. 5 shows the flow of a main routine executed by the CPU 5, in particular, of the electronic keyboard instrument of the present embodiment.

In FIG. 5, a step S1 is initially executed to effect initialization, by clearing MIDI I/F 13, communication I/F 14, timer 8, elements associated with graphics (not shown), such as a VRAM (video RAM), for displaying images on the display device 9, and so on, and opening a file of song or tune data (hereinafter merely referred to as "song data") of an automatic performance song or tune (hereinafter merely referred to as "song") to be played. In the present embodiment, a plurality of files of automatic performance song data are stored in the above-indicated FDD 10, and one or more of these song data files is/are read out in response to the instruction of the player, and then loaded in a song data storage area provided at a predetermined location of the RAM 5. In this connection, the automatic performance song data to be played may be selected from a plurality of sets of such data that are stored in advance in the ROM 6, or may be supplied from the CD-ROM drive 12 or from an external source through the MIDI I/F 13 or communication I/F 14.

At the next step S2, one of the screen display of FIG. 3 (displaying the miniature display keyboard 31 and piano roll paper 32) and the screen display of FIG. 4 (displaying the display keyboard 31, enlarged display keyboard 31' and piano roll paper 32') is provided depending upon a display mode selected by the player. While other forms of screen display may be provided in the actual apparatus, only these two types of screen display will be described for the sake of brevity.

At a step S3, it is determined whether a switch event has occurred on the switch panel 2, namely, any switch on the switch panel 2 has been operated or not. If the step S3 determines the occurrence of the switch event, a panel switch event process subroutine for performing processing according to the switch event is executed at a step S4. This subroutine will be described later, referring to FIG. 6. If no switch event has occurred, namely, if no switch has been operated, on the other hand, the step S4 is skipped and the control flow goes to a step S5.

At the step S5, it is determined whether the value of a concurrent proceeding timer as a software timer provided in a predetermined area of the RAM 7 is greater than "0" or not. The concurrent proceeding timer used herein denotes a timer for counting elapsed time (time KC) after key codes KC are stored in buffer 1 and buffer 2 (FIG. 14) in response to note-on events of the automatic performance data and key-depression events where keys are depressed by the player, respectively. Each of the buffers 1 and 2 is provided in a predetermined area of the RAM 7, and has a capacity enough to store a maximum of 32 key codes KC and the elapsed time (time KC) after storage of each key code KC, as shown in FIG. 14.

Figure 8:
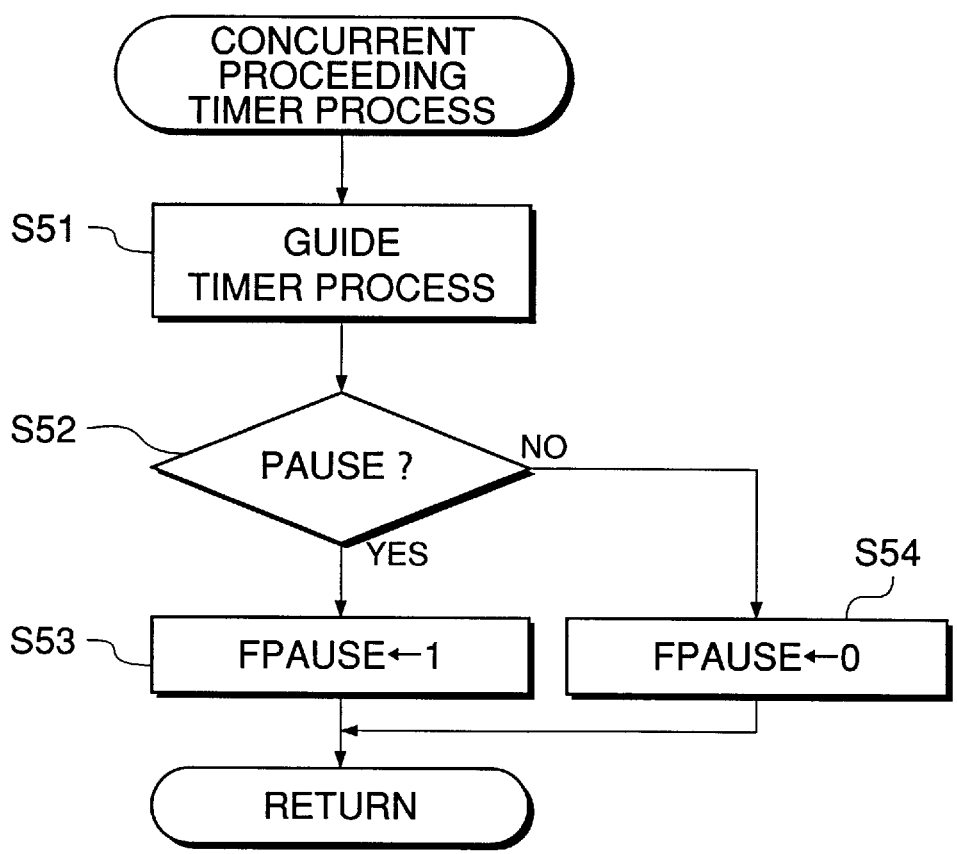
FIG. 8 is a flowchart showing in detail the flow of a concurrent proceeding timer process subroutine in FIG. 5.

If the step S5 determines that the value of the concurrent proceeding timer is greater than "0", a concurrent proceeding timer process routine which will be described later using FIG. 8 is executed at a step S6. If the value of the concurrent proceeding timer is equal to or smaller than "0", on the other hand, the step S6 is skipped and the control flow goes to a step S7.

Figure 9:
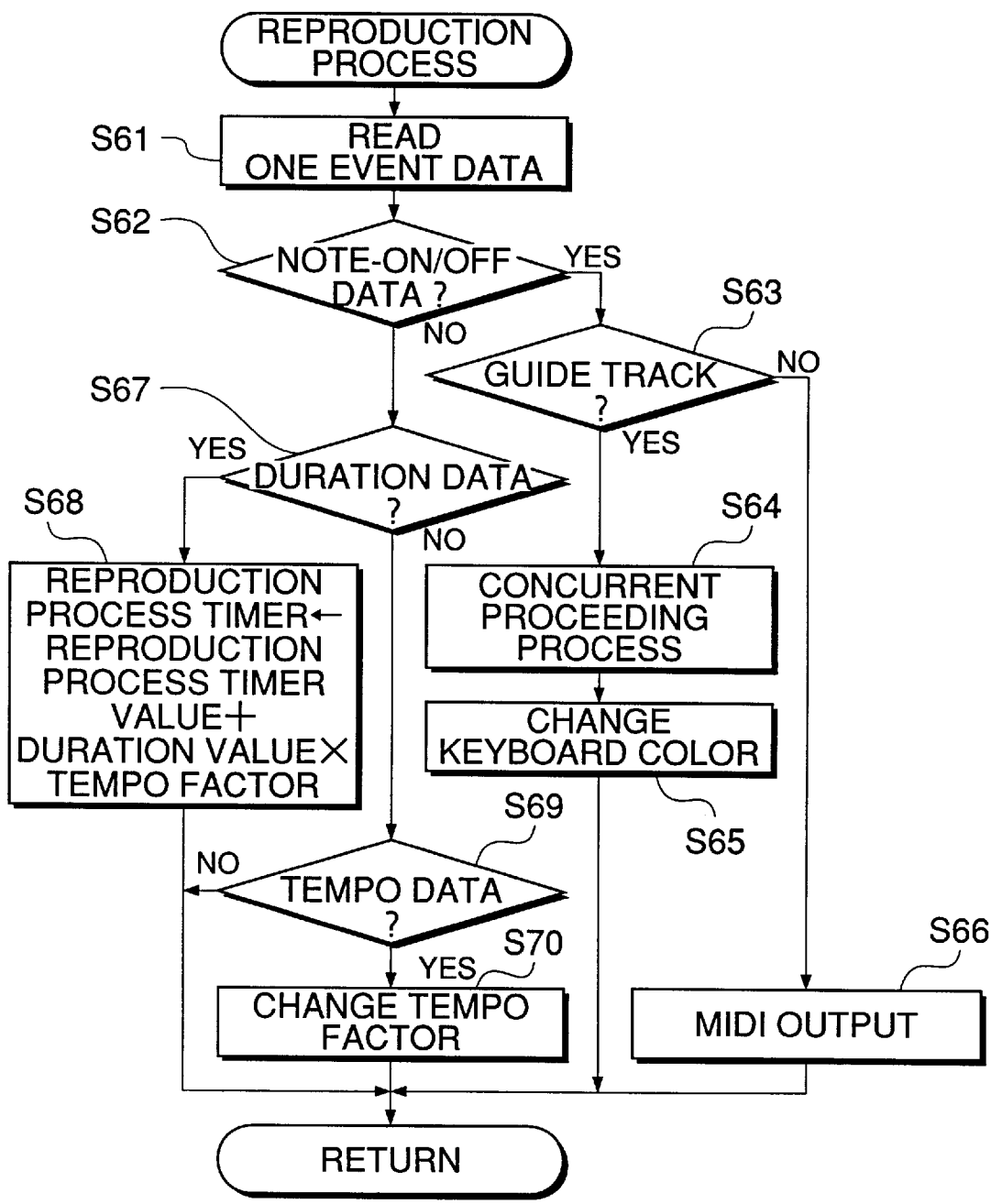
FIG. 9 is a flowchart showing in detail the flow of a reproduction process subroutine in FIG. 5.

To reproduce the automatic performance data, it is determined at the step S7 whether the value of a reproduction process timer provided in a predetermined area of the RAM 7 is greater than "0" not. If the step S7 determines that the value of the reproduction process timer is equal to or smaller than "0", a reproduction process subroutine which will be describer later using FIG. 9 is executed at a step S8. If the value of the reproduction process timer is greater than "0", the step S8 is skipped and the control flow goes to a step S9.

Figure 10:
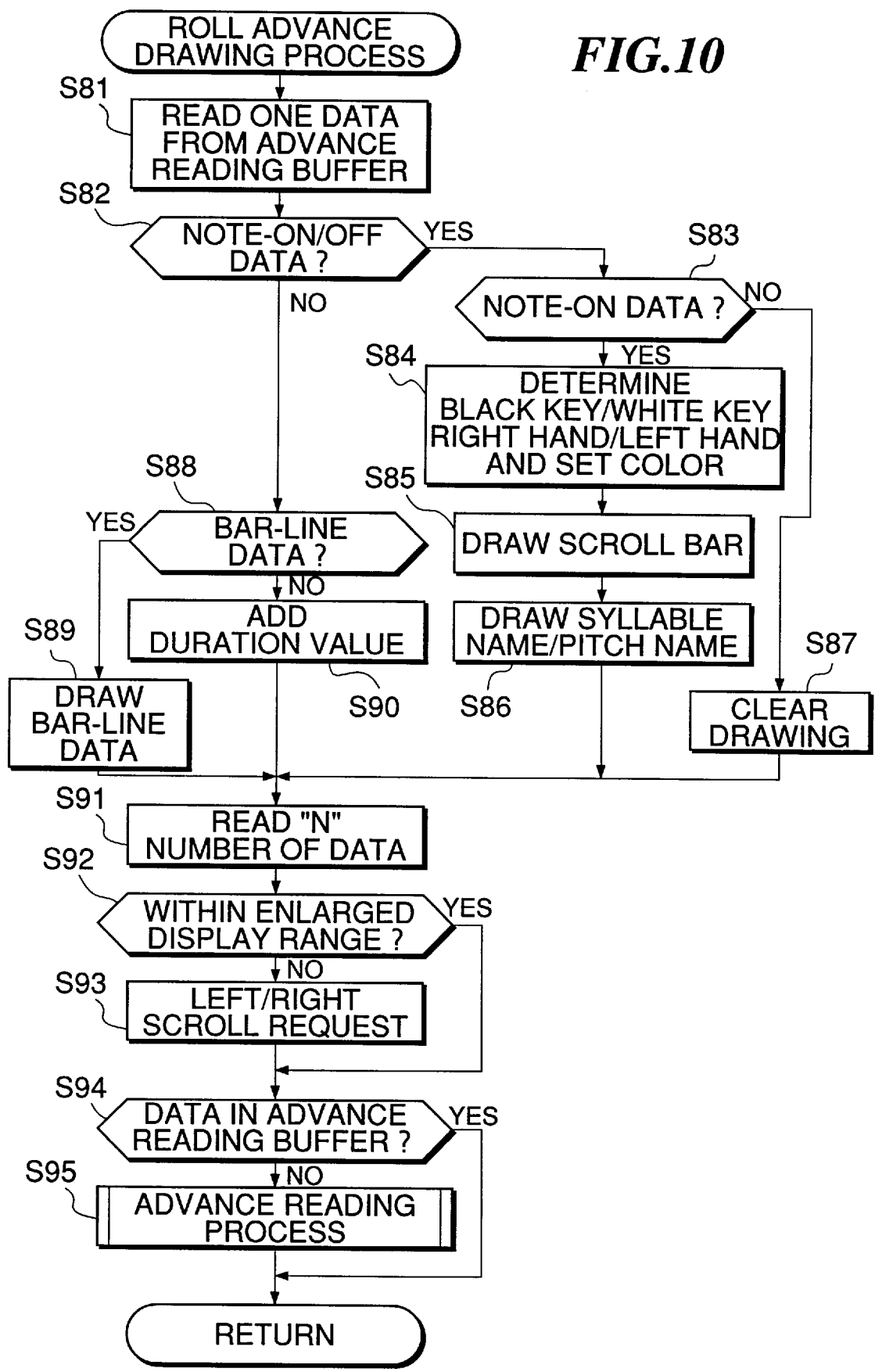
FIG. 10 is a flowchart showing in detail the flow of a roll advance drawing process subroutine in FIG. 5.

To draw a scroll bar or a bar-line on the piano roll paper 32 in advance, it is determined at a step S9 whether the value of an advance drawing timer that is a software timer provided in a predetermined area of the RAM 7 is equal to or smaller than "0". If the step S9 determines that the value of the advance drawing timer is equal to or smaller than "0", an advance drawing process subroutine described later using FIG. 10 is executed at a step S10. If the value of the advance drawing timer is grater than "0", on the other hand, the step S10 is skipped and the control flow goes to a step S11.

Figure 11:
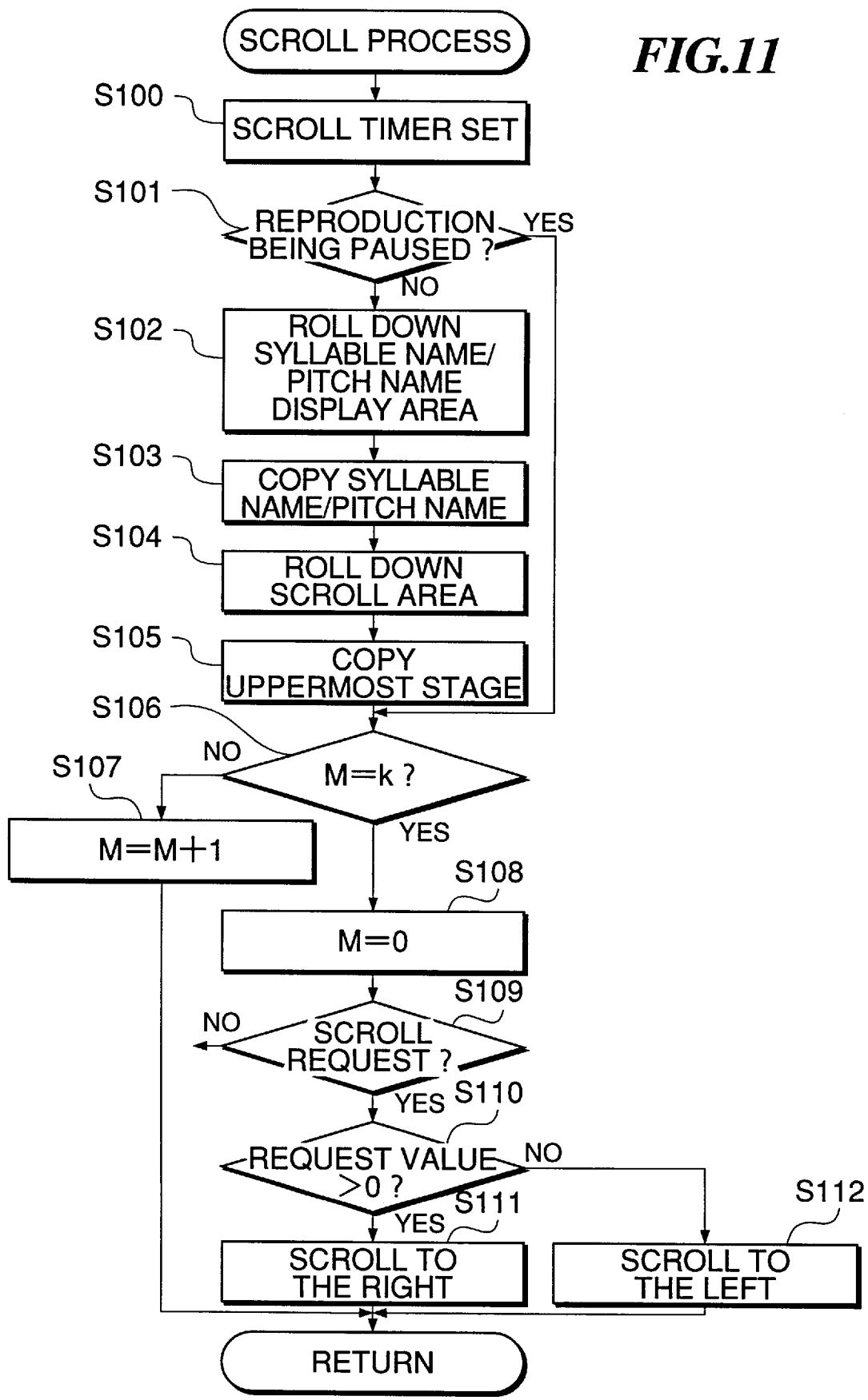
FIG. 11 is a flowchart showing in detail the flow of a scroll process subroutine in FIG. 5.

To scroll the piano roll paper 32, it is determined at a step S11 whether the value of a scroll timer which is a software timer provided in a predetermined area of the RAM 7 is equal to or smaller than "0". If the step S11 determines that the scroll timer value is equal to or smaller than "0", a scroll process subroutine described later using FIG. 11 is executed at a step S12. If the value of the scroll timer is smaller than "0", on the other hand, the step S12 is skipped and the control flow proceeds to a step S13.

Figure 12:
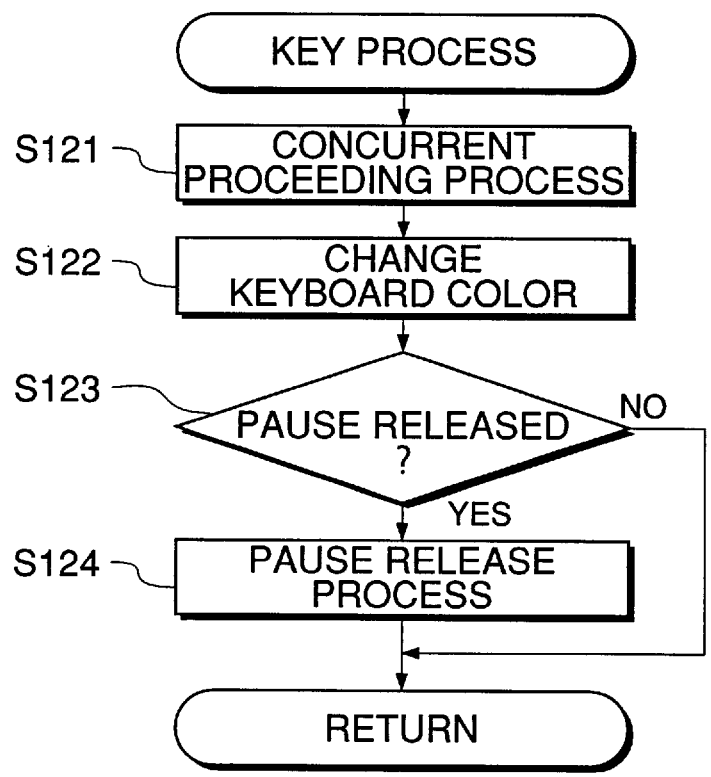
FIG. 12 is a flowchart showing in detail the flow of a key process subroutine in FIG. 5.

At the step S13, it is determined whether any key event, namely, a key-depression event or a key-release event, has occurred on the keyboard 1 or not. If the step S13 determine that a key event has occurred, a key process subroutine which will be described later using FIG. 12 is executed at a step S14. If no key event has occurred, step S14 is skipped and the step S15 is then executed.

After other processes than the above-described processes are performed at a step S15, the control flow returns to the step S3, and the above-described processes are repeated.

The counting of the concurring proceeding timer, reproduction process timer, advance drawing timer and scroll timer as indicated above is effected in a timer interrupt routine which will be described later using FIG. 13.

Figure 6:
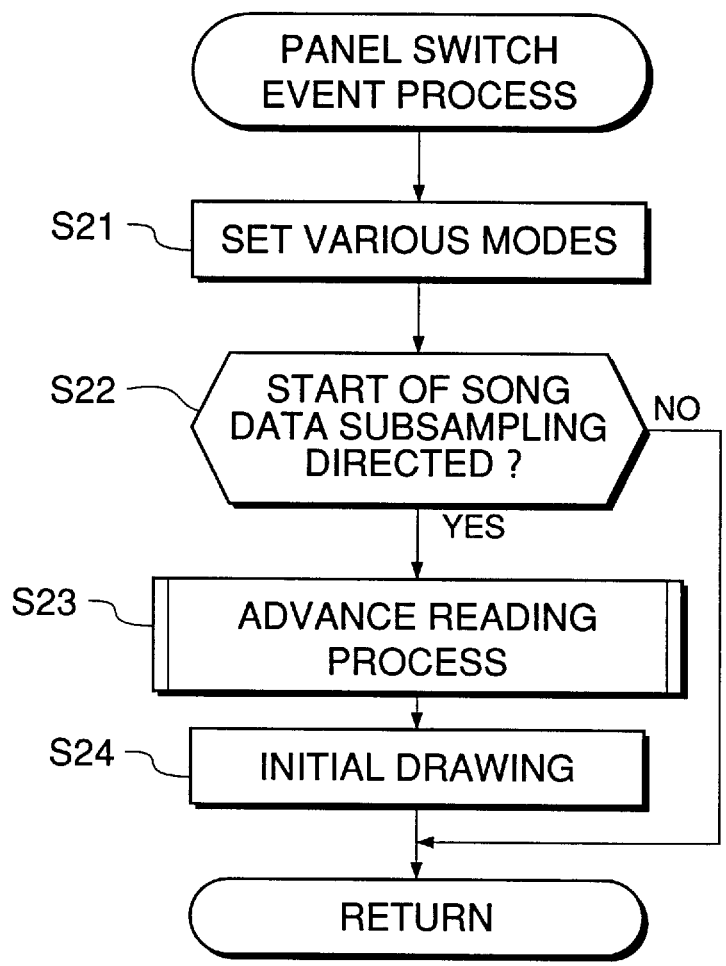
FIG. 6 is a flowchart showing in detail the flow of a panel switch event subroutine in FIG. 4.

FIG. 6 shows in detail the flow of the panel switch event process subroutine of the above-indicated step S4.

In FIG. 6, a step S21 is initially executed to set various modes depending upon a switch event or events that occur(s) when a switch or switches on the switch panel 2 is/are operated by the player. The modes set at this step may include: automatic performance mode in which the player can direct start and stop of automatic performance; performance guidance mode in which the player can direct on- and off-states of a performance guidance function where the player can turn on and off the performance guidance function; and part setting mode in which the player can direct operative and inoperative states of right-hand and left-hand parts.

Figure 7:
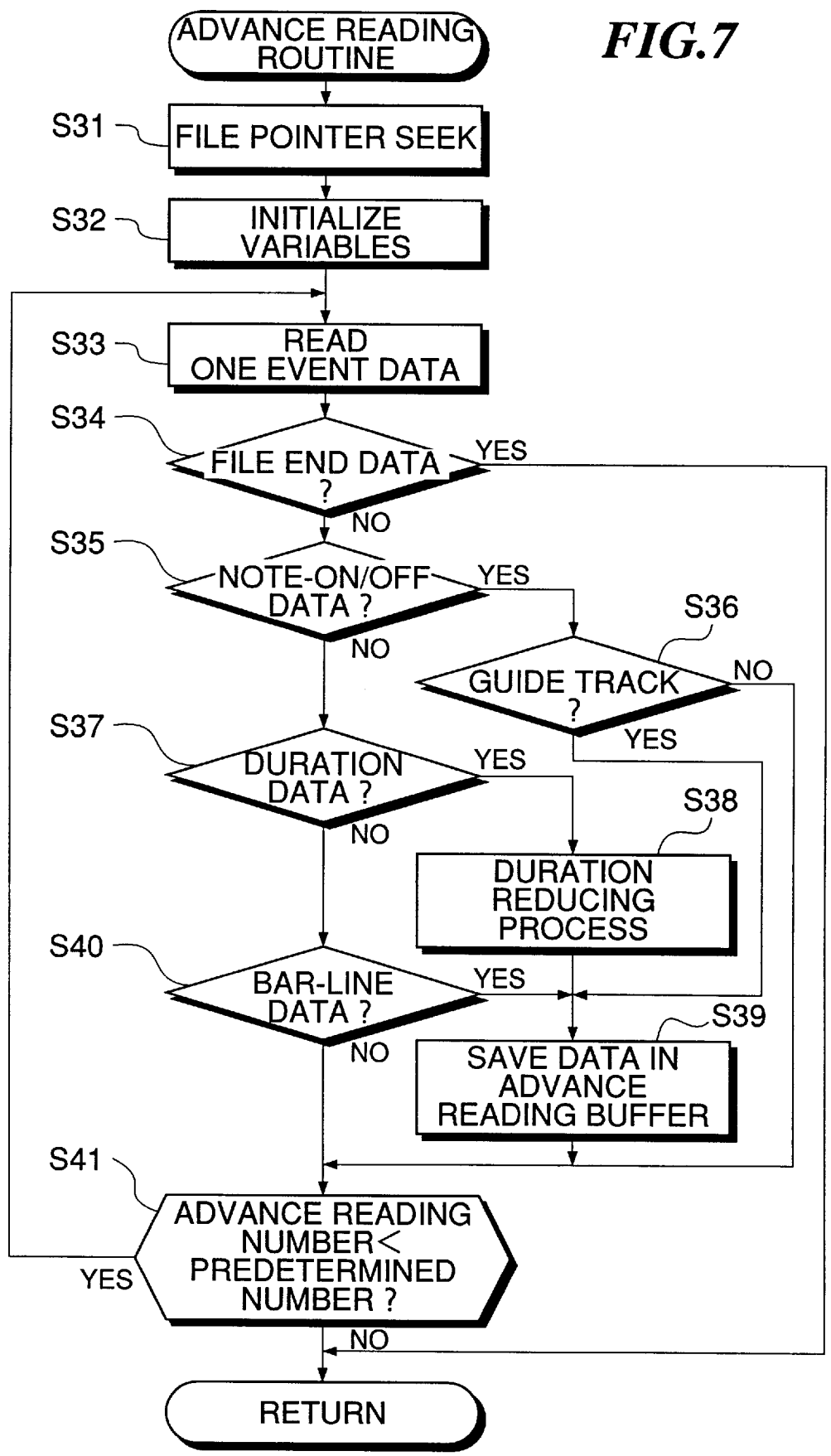
FIG. 7 is a flowchart showing in detail the flow of an advance reading process subroutine in FIG. 6.

At the next step S22, it is determined whether the start of the automatic performance has been directed or not. If it has been directed, an advance reading process subroutine described later using FIG. 7 is executed at a step S23. On the basis of the information obtained in this advance reading process subroutine, initial drawing is conducted at a step S24 to display initial conditions of scroll bars and syllable names or pitch names, for example, on the display screen (display screen of FIG. 3 or FIG. 4) of the selected display mode. After execution of the step S24, the present panel switch event process subroutine is terminated.

If the step S22 determines that the start of the automatic performance has not been directed, the present panel switch event process subroutine is immediately terminated.

FIG. 7 shows in detail the flow of the advance reading routine of the above-indicated step S23. In the present advance reading process subroutine, data are processed and saved in an advance reading buffer provided in a predetermined area of the RAM 7, so as to produce the display screen of FIG. 3 or FIG. 4.

In FIG. 7, a step S31 is initially executed to perform a file pointer seeking process where the head of the automatic performance data that have been designated to be played is seeked, and a file pointer is located at the location of the head of the automatic performance data. Since the automatic performance data are stored in the song data storage area of the RAM 7 in the present embodiment, the file pointer seeking process is effected so that the file pointer designates the address location of the head of the relevant automatic performance data.

A step S32 is then executed to initialize various variables used in the present subroutine, which include a writing pointer used for writing (saving) data in the above-indicated advance reading buffer.

At the next step S33, the file pointer is incremented by "1", and event data stored at the location designated by the file pointer are read out. At a step S34, it is determined whether the event data thus read are file end data as indicated above or not. If the step S34 determines that the read event data are file end data, the present advance reading process subroutine is immediately terminated. If the read event data are not the file end data, on the other hand, it is determined at a step S35 whether the event data are note-on/note-off event data as indicated above.

If the step S35 determines that the read data are note-on/note-off event data, it is determined at a step S36 whether the relevant data belong to any guide track, namely, to the MIDI channel 1 or 2.

If the step S36 determines that the read note-on/note-off event data belong to a guide track, a step S39 is executed to increment the writing pointer by "1", and save the data at the location of the advance reading buffer that is designated by the writing pointer. If the read note-on/note-off event data do not belong to any guide track, the control flow proceeds to a step S41.

If the step S35 determines that the event data read at the step S33 are not the note-on/note-off event data, a step S37 is executed to determine whether the same data are duration data or not.

If the determination at the step S37 indicates that the read data are duration data, a duration data-reducing process is effected at a step S38, and then the control flow goes to the step S39. Where note event data of other track or tracks (channel or channels) are interposed between the note event data of the guide track, whereby a plurality of duration data are included between two adjacent note event data of the guide track, the duration-reducing process is effected to reduce the plurality of duration data into one so as to produce only one duration data between the note event data of the guide track. This duration reducing process is effected for the following reason. Since the data stored in the advance reading buffer are only event data associated with two channels (guide tracks) out of 16 channels, a time interval between the event data of these two channels may be divided into a plurality of duration data; in such a case, it is more convenient to reduce the plurality of duration data into one, and handle only one duration data.

If the step S37 determines that the event data read at the step S33 are not duration data, on the other hand, it is determined at a step S40 whether the read data are bar-line data or not.

If the determination at the step S40 indicates that the read data are bar-line data, the control flow goes to the step S39. If the read data are not bar-line data, the step S41 is executed to determine whether the advance reading amount is smaller than a preset value, namely, the maximum amount of data that can be stored in the advance reading buffer. This step S41 is not needed if the advance reading buffer has a sufficiently large capacity as compared with the capacity of the area in which the automatic performance data is stored.

If the step S41 determines that the advance reading amount is smaller than the preset value, the control flow returns to the step S33 and the above-described process is repeated. If the advance reading amount is equal to or greater than the preset value, the present advance reading process subroutine is terminated.

FIG. 8 shows in detail the flow of the concurrent proceeding timer routine of the step S6 in FIG. 5.

Initially, where key-depression event data (key code KC) are stored in the buffer 1 or 2, a step 51 is executed to perform a guide timer process for clearing the concurrent proceeding timer, by adding the value of the concurrent proceeding timer to the elapsed time data (time KC) stored in association with the key code KC. In this connection, the buffer 1 is a buffer into which are written key codes KC corresponding to key-on events that occur when keys are depressed by the player, as described above, and the writing of the key codes KC is effected in the key process subroutine of the step S14 (which will be described later in detail using FIG. 12). The buffer 2, on the other hand, is a buffer into which are written key codes KC corresponding to note-on events in the guide tracks which occur during reproduction of the automatic performance data, and the writing of the key codes KC is effected in the reproduction process subroutine of the step S8 (which will be described later in detail using FIG. 9). The data written into the buffer 1 are deleted when the player releases the corresponding keys, and the data written in the buffer 2 are deleted upon occurrence of corresponding note-off events.

At the next step S52, it is determined whether the reproduction of the automatic performance data is to be temporarily stopped (paused) or not. More specifically, the data stored in the buffer 1 are compared with the data stored in the buffer 2, and if any key code KC that has been stored in the buffer 1 for a predetermined time is not stored in the buffer 2, the step S52 determines that the reproduction should be paused. If there is any key code KC that is stored in the buffer 2 but not stored in the buffer 1, and the above predetermined time has not elapsed since the key code KC was stored in the buffer 2, or if all of the key codes KC stored in the buffer 2 are stored in the buffer 1, the step S52 determines that the reproduction should be continued (should not be paused).

If the step S52 determines that the reproduction is to be paused, a step S53 is executed to set a pause request flag FPAUSE to "1" that represents the request for the pause, and then the present concurrent proceeding timer process subroutine is terminated.

If the step S52 determines that the reproduction is not to be paused, a step S54 is executed to reset the pause request flag FPAUSE to "0", and then the present concurrent proceeding timer process subroutine is terminated.

FIG. 9 shows in detail the flow of the reproduction process subroutine of the step S8 in FIG. 5.

In FIG. 9, a step S61 is initially executed to read one event data at a location designated by a reproduction pointer provided in a predetermined area of the RAM 7, so as to reproduce the automatic performance data. A step S62 is then executed to determine whether the event data thus read are note-on/note-off event data.

If the step S62 determines that the read event data are note-on/note-off event data, it is determined at a step S63 whether the read note event data belong to any guide track (channel 1 or channel 2).

If the step S63 determines that the read note event data belong to the guide track, a step S64 is executed to perform the concurrent proceeding process depending upon the type of the event data. More specifically, if the read event data are note-on event data, the key code KC corresponding to the note-on event is written into the buffer 2 of FIG. 14. If the read event data are note-off event data, on the other hand, the key code KC corresponding to the note-off event and its elapsed time data (time KC) are deleted from the buffer 2.

At the following step S65, a keyboard color-changing routine for changing the color of keys on the miniature display keyboard 31 is executed based on the data stored in the buffer 2, as explained above referring to FIG. 3, and then the present reproduction process subroutine is terminated.

If the determination at the step S63 indicates that the read note event data do not belong to the guide track, a MIDI signal (code) corresponding to the event data is generated at a step S66, and the present reproduction process subroutine is terminated.

If the determination at the step S62 indicates that the read event data are not note-on/note-off event data, a step S67 is executed to determine whether the event data are duration data or not.

If the determination at the step S67 indicates that the read event data are duration data, a step S68 is executed to update the value of the above-indicated reproduction process timer according to the following equation: reproduction process timer=reproduction process timer value+duration value× tempo factor, and the present reproduction process subroutine is terminated.

If the determination at the step S67 indicates that the read event data are not duration data, a step S69 is executed to determined whether the read event data are tempo data or not.

If the step S69 determines that the read event data are tempo data, a step S70 is executed to change the tempo factor depending upon the tempo data. If the read event data are not tempo data, the present reproduction subroutine is terminated.

FIG. 10 shows in detail the flow of the roll advance drawing process of the step S10 in FIG. 5.

To read out data from the advance reading buffer, a step S81 is initially executed to advance by "1" a reading pointer provided in a predetermined area of the RAM 7, and read one event data at the location designated by the reading pointer. A step S82 is then executed to determine if the read event data are note-on/note-off event data or not.

If the step S82 determines that the read event data are note-on/note-off event data, a step S83 is executed to determine whether the data are note-on event data.

If the step S83 determines that the read note event data are note-on event data, a step S84 is executed to determine whether the data are black-key or white-key, right-hand or left-hand data, and set the color of the corresponding scroll bar depending upon the type of the data thus determined, as explained above referring to FIG. 3. Then, as described later using FIG. 16, a step S85 is executed to draw the scroll bar in the first and second lines of the region of the scroll area 32a in which the scroll bar is to be displayed, and a step S86 is executed to draw the syllable name or pitch name below the scroll bar.

If the step S83 determines that the read note event data are not note-on event data, namely, if it is note-off event data, a step S87 is executed to eliminate the drawing of the scroll bar in the first and second lines.

If the step S82 determines that the read event data are not note-on/note-off event data, a step S88 is executed to determine whether the event data are bar-line data or not. If the determination indicates that the read event data are bar-line data, a step S89 is then executed to draw a bar-line in the second line, as described later using FIG. 16. If the read event data are not bar-line data, namely, if it is duration data, on the other hand, a step S90 is executed to update the value of the advance drawing timer according to the following equation:

advance drawing timer=advance drawing timer value+ duration value×tempo factor.

Then, at a step S91, a predetermined number (N) of data as counted from the location designated by the reading pointer are read from the advance reading buffer, and a step S92 is executed to search the lowest value and the highest value of the key codes of the note-on/note-of event data in the above number (N) of data, and determine whether the range delimited by the lowest and highest values is within the current enlarged display range or not. If the step S92 determines that the delimited range is not within the enlarged display range, a step S93 is executed to make a left/right scroll request for scrolling the enlarged display range to the left or to the right. More specifically, the left/right scroll request is made by storing a value representing the direction and amount of scrolling requested, in a scroll request region provided in a predetermined area of the RAM 7. This scroll request region stores a negative value (and its absolute value indicates the scroll amount) if the scrolling is to be effected in the left direction, and stores a positive value (and its absolute value indicates the scroll amount) if the scrolling is to be effected in the right direction.

If the step S92 determines that the range delimited by the lowest and highest values of the key codes is within the current enlarged display range, on the other hand, a step S93 is skipped and the control flow goes to a step S94.

At the step S94, it is determined whether any data still remain in the advance reading buffer, and, if no data remain, the advance reading process subroutine as explained above referring to FIG. 7 is executed at a step S95. If data still remain in the advance reading buffer, on the other hand, the present roll advance drawing process subroutine is immediately terminated.

FIG. 11 shows in detail the flow of the scroll process subroutine of the step S12 in FIG. 5.

Initially, a step S100 is executed to set the scroll timer to the initial value.

Next, a step S101 is executed to determine whether the reproduction of the automatic performance data is being paused or not. More specifically, this determination is made by detecting the state of the pause request flag FPAUSE.

If the step S101 determines that the reproduction is not being paused, namely, if the flag FPAUSE is set to "0", the syllable-name/pitch-name display area 32b is rolled down at a step S102, and the syllable name or pitch name is copied at a step S103. Then, the scroll area 32a is rolled down at a step S104, and the uppermost stage is copied at a step S105. In the following description, the processing of these steps S102–S105 will be explained referring to FIGS. 15A to 15C and 16.

FIG. 15A shows one display state in which a displayed pitch name "C" extends over or overlaps the scroll area 32a and the syllable-name/pitch-name display area 32b, and FIG. 15B is an enlarged view showing in enlargement the vicinity of the boundary between the scroll area 32a and the syllable-name/pitch-name display area 32b in the state of FIG. 15A. FIG. 15C shows another display state in which the piano roll paper 32 has further scrolled from the state of FIG. 15(a).

In FIG. 15B, dot D1 represents one of dots for displaying the pitch name "C", which is located in the scroll area 32a, and dot D2 represents another one of the dots for displaying the pitch name "C", which is located in the syllable-name/pitch-name display area 32b ("dot" is the minimum unit of drawing). As described above, the syllable name or pitch name is displayed in "white" when it is displayed in the scroll area 32a, and is displayed in "purple" when it is displayed in the syllable-name/pitch-name display area 32b. This process is performed as the syllable-name/pitch name display area roll down process of the step S102, in which a process of changing the display color is effected in addition to a roll down process as described later using FIG. 16.

To establish the display state of FIG. 15C, the scrolling operation proceeds from the state of FIG. 15A until the pitch name "C" is entirely located in the syllable-name/pitch-name display area 32b. The pitch name "C" does not move in the syllable-name/pitch-name display area 32b and is kept in the same position as indicated in FIG. 15C even if the scrolling operation further proceeds from the state of FIG. 15C. Then, the display of the pitch name "C" disappears at the same time when the scroll bar corresponding to the pitch name "C" disappears from the scroll area 32a. This process is effected as the copying process of the step S103 in which only the pitch name is copied. In this process, when the scrolling operation proceeds from the state of FIG. 15C, the pitch name "C" is copied in the syllable-name/pitch-name display area 32b so that the pitch name "C" does not move in the syllable-name/pitch-name display area 32b, and the pitch name "C" is eliminated at the same time when the scroll bar corresponding to the pitch name "C" disappears from the scroll area 32a.

Figure 16A:
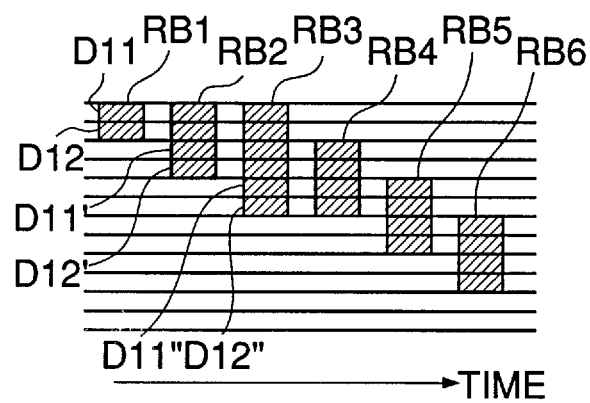
FIGS. 16A to 16D are views useful in explaining steps S102 through S105 in FIG. 11.
Figure 16B:
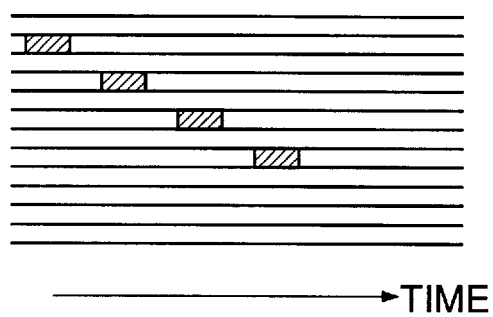
Figure 16C:
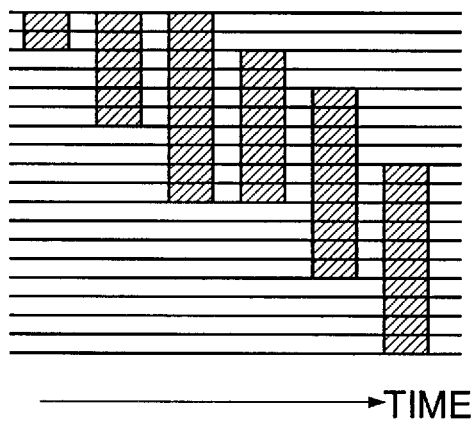
Figure 16D:
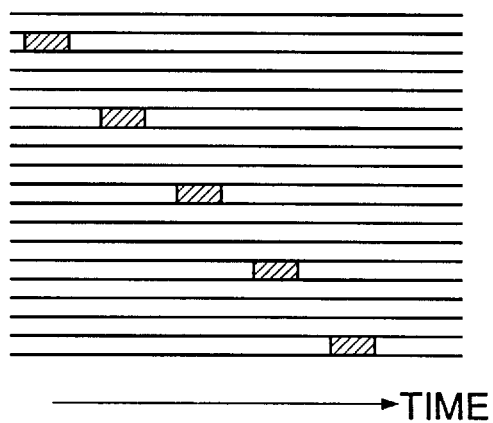

FIG. 16A shows a method of scrolling one of the scroll bars of FIGS. 3A and 3B (indicating a time period from a note-on event to a note-off event) at a single speed, and FIG. 16B shows a method of scrolling one of the bar-lines of FIGS. 3A and 3B (indicated by broken lines) at the single speed. FIG. 16C shows a method of scrolling the scroll bar of FIG. 16A at a double speed, and FIG. 16D shows a method of scrolling the bar-line of FIG. 16B at the double speed.

Once the process of the step S85 in FIG. 10 is performed, dots D11 and D12 whose color has been determined in the process of the step S85 are displayed in the first and second lines of the scroll area 32a, as shown in FIG. 16A. Upon execution of the step S104 in FIG. 11, the dots D11 and D12 are rewritten as they are in the third and fourth lines, so that dots D11' and D12' are displayed. In this manner, the scroll bar RB1 is scrolled downward one time (by two dots), to provide the scroll bar RB2. If the scroll bar RB2 is scrolled downward one time, the dots D11' and D12' are rewritten as they are in the fifth and sixth lines so that dots D11" and D12" are displayed, and data of the dots D11 and D12 are rewritten in the dots D11' and D12'. Then, if note-off event data are read from the advance reading buffer, and the drawing clearing process is effected at the step S87 in FIG. 10, the background of the scroll area 32a is written into the first and second lines of the scroll area 32a, as shown in the scroll bar RB4. The scroll bar RB4 is then scrolled based on data of the first and second lines, to provide scroll bars RB5 and RB6 in the same manner in which the scroll bars RB2 and RB3 are produced.

As described above, the scroll bar is scrolled by shifting data initially displayed in the first and second lines to a position that are spaced apart from the lines having the data at a predetermined interval, so as to improve the speed of the scrolling process as much as possible. Namely, in the present embodiment, the scrolling process is conducted in the main routine as described above, without using any special hardware or the like, and therefore the time spent for the scrolling process is limited. If the scrolling is to be effected without using the above-described scrolling method, there must be added a process for searching the event data in the key-on state, in particular its note number, for example, which undesirably increase the time spent for the scrolling process.

While a bar-line is displayed in the form of a horizontal line (broken line as shown in FIG. 3) of one dot (line), as shown in FIG. 16B, the scrolling of this bar-line is effected by writing data into a line located two lines below the line in which the data has been written, based on data written in the first and second lines of the scroll area 32a, in the same manner as in FIG. 16A.

At the step S105 in FIG. 11, the data in the uppermost line, namely, the first line, is copied on the second line. Where the scroll bar is displayed, the dots in the first and second lines are both displayed in the same color representing the scroll bar. Therefore, even if the data in the first line is copied on the second line, the display state does not change from the previous one, and the scroll bar still remains displayed. Where the bar-line is displayed, however, the dot in the first line is displayed in the color representing the scroll bar or the background, though the dot in the second line is displayed in the color representing the bar-line. If the data in the first line is copied on the second line, therefore, the second line as well as the first line is given the color of scroll bar or the background. Namely, if the process of the step S105 is effected with respect to the bar-line, the portion in which the bar-line was previously displayed is changed into the color of scroll bar or background. In this manner, if the scroll bar is drawn at the step S85, its length is extended downward by executing the steps S104 and S105. If the bar-line is drawn at the step S85, on the other hand, the display position of the bar-line is only moved downward by executing the steps S104 and S105. Thus, the same process of the steps S104, S105 produces different results, namely, downward extension of the scroll bar and downward movement of the bar-line. The process of extending the scroll bar downward continues until the drawing of the scroll bar is cleared at the step S87, and then the background is displayed from the point of time when the drawing is cleared, until another scroll bar appears upon the next note-on event.

FIG. 16C shows another scrolling method that is different from that of FIG. 16A only in that the scroll bar is scrolled at the double-speed (by four lines at a time). FIG. 16D shows another scrolling method that is different from that of FIG. 16B only in that the bar-line is scrolled at the double-speed (by four lines at a time). The operation of scrolling the scroll bar and bar-line may be switched from the single-speed mode as shown in FIGS. 16A and 16B to the double-speed mode as shown in FIGS. 16C and 16D, in the case where the display, if it is scrolled in the single-speed mode, is delayed with respect to the actual proceeding of the song due to excessive processes to be performed in the main routine. Where the CPU 5 has a sufficiently high processing speed and does not suffer from delay in the display, therefore, the scrolling may be conducted only in the single-speed mode. To switch the display from the single-speed mode to the double-speed mode, the value of the scroll timer indicated above may be examined, and the switching may be conducted based on the result of the examination, for example. More specifically, a process of detecting the value by which the scroll timer is reduced upon completion of one cycle of the main routine may be added to the other processes (step S15) of the main routine of FIG. 5, for example, and a flag may be set or reset depending upon the reduced value thus detected, so that the switching from the single-speed mode to the double-speed mode is effected at the step S104 in FIG. 11 by observing the state of this flag.

In the present embodiment, one scrolling operation is accomplished by drawing the scroll bar or bar-line for two lines depending upon the type of the event in the roll advance drawing process (in which both of the two lines are given the color of scroll bar when a note-on event takes place, and given the color of background when a note-off event takes place, and only the second line is given the color of bar-line when a bar-line event takes place), scrolling the scroll bar or bar-line downward by two lines in the scrolling process, and then copying the data in the uppermost line (first line) on the second line. It is, however, to be understood that the number of lines by which the scroll bar and bar-line are drawn and/or scrolled may be changed as desired. For example, one scrolling operation may be achieved by drawing the scroll bar or bar-line for three lines depending upon the type of the event in the roll advance drawing process (in which all three lines are given the color of scroll bar when a note-on event takes place, and given the color of background when a note-off event takes place, and the first and second lines are given the color of scroll bar or background and the third line is given the color of bar-line when a bar-line event takes place), scrolling the scroll bar or bar-line downward by three lines in the scrolling process, and then copying the data in the first and second lines on the third line. In another method, upon occurrence of a bar-line event, the first line may be drawn with the color of bar-line, and the second line may be drawn with the color of scroll bar or background, followed by the scrolling process in which the data in the second line is copied on the first line. In sum, it suffices that the color of scroll bar is always displayed in the first several lines during the time from the note-on event to the note-off event, and the color of background is always displayed in the first several lines during the time from the note-off event to the note-on event, and that the bar-lines are displayed such that a part of the first several lines is given the color of bar-line, and the rest is given the color of scroll bar or background, and the scrolling process is effected so that the display in the color of bar-line is replaced by the display in the color of scroll-bar or background. If these conditions are satisfied, the number of lines and the manner of copying may be freely selected.

Returning back to FIG. 11, when the step S101 determines that the reproduction of the automatic performance is being paused, namely, when the flag FPAUSE is equal to 1, the control flow goes to a step S106 to determine whether the value of a software counter M provided in a predetermined area of the RAM 7 for counting the number of times the present scroll process subroutine has been called is equal to a predetermined value k or not. If this determination indicates that the value of the counter M is not equal to "k", the counter M is incremented by "1" at a step S107, and then the present scroll process subroutine is terminated. If the step S106 determines that the value of the counter M is equal to "k", on the other hand, the counter M is reset (M=0) at a step S108, and the value of the scroll request region is examined to determine at a step S109 whether the scroll request is present or not.

If the step S109 determines that the value (request value) of the scroll request region is not equal to "0", namely, if the scroll request is being made, a step S110 is executed to determine whether the request value is positive or negative. If this determination indicates that the request value is positive (>0), a step S111 is executed to scroll the expanded display area to the right by an amount corresponding to the request value. If the request value is negative (<0), on the other hand, a step S112 is executed to scroll the expanded display area to the left by an amount corresponding to the absolute value of the request value.

Since one process of moving the expanded display area takes a lot of time if the left or right scroll amount is large, the display area may be moved in several steps (for example, moved in one step by an amount corresponding to one white key). In this case, the expanded display area is gradually moved, and thus can be more easily observed.

If the step S109 determines that the request value is "0", on the other hand, the present scroll process subroutine is immediately terminated.

FIG. 12 shows in detail the flow of the key process subroutine of the step S14 in FIG. 5.

In FIG. 12, a step S121 is initially executed to perform a concurrent proceeding process in response to depression or release of a key. More specifically, when a key is depressed, the key code KC corresponding to the depressed key is written into the buffer 1 of FIG. 14A. When a key is released, on the other hand, the key code KC corresponding to the released key is deleted from the buffer 1.

A step S122 is then executed to perform a keyboard color-changing process based on the data stored in the buffer 1, in the same manner as at the step S65 in FIG. 9. More specifically, corresponding key codes KC stored in the buffer 1 and buffer 2 are compared with each other, and if they coincide with each other, the color of the key on the miniature display keyboard 31 that has been depressed is changed into blue, while if they are not identical with each other, the color of the key is changed into red. Then, a step S123 is executed to determine whether the pause state is to be released or not. At this step, the determination as to whether the pause state is to be released or not is made by comparing the corresponding contents of the buffers 1 and 2, and determine whether the key(s) corresponding to the automatic performance data that have been held in the pause state has/have been depressed.

If the step S123 determines that the pause state is to be released, a step S124 is then executed to perform a pause release process by resetting the pause request flag FPAUSE to "0", for example. If the automatic performance data is not held in the pause state, or the pause state is not to be released, the present key process subroutine is terminated.

Figure 13:
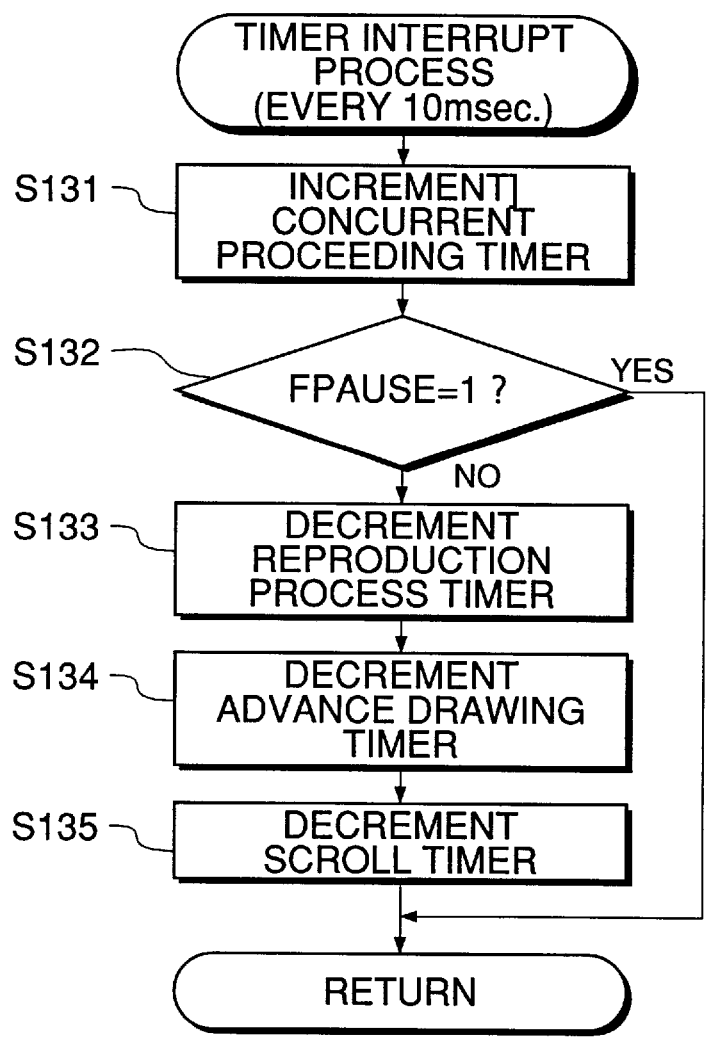
FIG. 13 is a flowchart showing the flow of a timer interrupt routine.

FIG. 13 shows the flow of the timer interrupt routine. This timer interrupt routine is executed in response to an interrupt signal which the timer 8 produces in the CPU 5 every 10 msec.

In FIG. 13, a step S131 is initially executed to increment the above-indicated concurrent proceeding timer by "1".

Then, a step S132 is executed to determine the current state of the pause request flag FPAUSE, and if the pause request flag FPAUSE is set to "1", namely, if the reproduction of the automatic performance data is being paused, the present timer interrupt routine is immediately terminated. If the pause request flag FPAUSE is set in "0", namely, if the reproduction is not being paused, on the other hand, the control flow goes to a step S133.

At the step S133, the reproduction process timer is decremented by "1", and a step S134 is then executed to decrement the advance drawing timer by "1". Then, the scroll timer is decremented at a step S135, followed by terminating the present timer interrupt routine.

Although various other processes are actually performed in the timer interrupted routine, these processes are not essential for explaining the present invention, and thus description of them is omitted.

Figure 17:
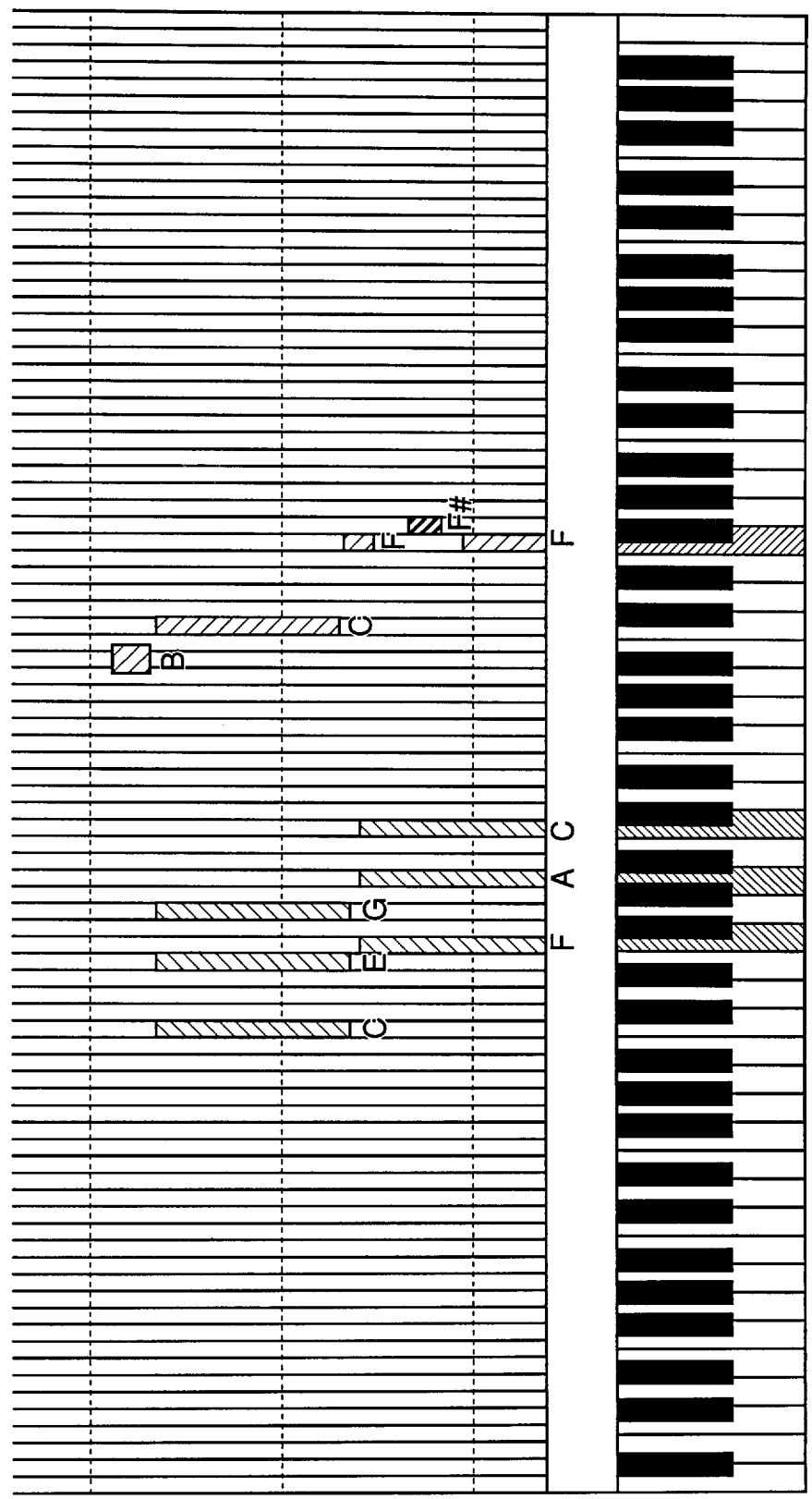
FIG. 17 is a view showing another example of display provided on the display device in FIG. 1.

FIG. 17 shows another example of the display provided on the display device 9.

The scroll area 32a of the piano roll paper 32 in the example of FIG. 3 is equally divided into the regions whose number is equal to that of the white keys on the keyboard 1, whereas the scroll area 32a in the example of FIG. 17 is equally divided into a plurality of regions whose number is equal to that of all keys (white keys and black keys) on the keyboard 1. Further, in the display example of FIG. 17, the width of scroll bars is changed depending upon the magnitude of the velocity of the note event data, as exemplified by the scroll bar having the pitch name "B". Thus, the width of scroll bars may be also changed in the example of FIG. 3 depending upon the magnitude of the velocity.

Although the width of the scroll bar for "B" is larger than the width defined by the adjacent vertical lines of the scroll area in the example of FIG. 17, the width of the scroll bar may be changed or controlled within the width between the vertical lines, depending upon the magnitude of the velocity.

While each region (in which each scroll bar scrolls) that is obtained by dividing the scroll area 32a has the same width at any point in the vertical direction of the scroll area 32a in both of the examples of FIGS. 3 and 17, the present invention is not limited to this arrangement, but the width of each region may be narrowed or reduced toward the upper edge of the scroll area 32a. In this case, a portion of the region that reaches the syllable-name/pitch-name display area 32b in a shorter time is displayed with a larger thickness, and the corresponding portion of the song (automatic performance data) that should be played next is thus emphasized. To the contrary, the width of each region in the scroll area 32a may be increased toward the upper edge of the scroll area. In the present embodiment, the miniature display keyboard 31 is displayed in the lower portion of the screen of the display device 9 while the scroll area 32 is displayed in the upper portion of the screen, and the scroll bars are scrolled from the upper side to the lower side of the scroll area 32. To the contrary, the miniature display keyboard 31 may be displayed in the upper portion of the screen of the display device 9 while the scroll area 32a may be displayed in the lower portion of the screen, and the scroll bars may be scrolled from the lower side to the upper side of the scroll area 32.

As explained above, in the present embodiment, the miniature display keyboard 31 displayed on the display device 9 represents the keyboard 1 when it is reduced in size and viewed from the player sitting in front of (or facing) the keyboard 1, and the piano roll paper 32 is oriented such that each region corresponding to each key on the keyboard extends in the vertical direction so that the piano roll paper 32 scrolls in the vertical direction as the automatic performance song proceeds. This arrangement enables the player, especially a beginner who cannot read staff notations or scores, to easily recognize the position of keys to be operated.

Further, the time length from the note-on event (key-on action) to the note-off event (key-off action), namely, the time period during which the key is to be depressed, is represented by the length of each scroll bar, thus making it easy for the player to grasp the timing in which the key should be released.

Moreover, the display on the piano roll paper 32 indicates keys that should be currently operated, along with keys that are included in a given following range of the automatic performance data and should be operated in the near future, thus permitting the player to read in advance the proceeding of the song.

Furthermore, the color of scroll bars is varied depending upon the right-hand data or the left-hand data, and the syllable name is displayed below each scroll bar. This arrangement assures improved visibility of key operations, and provides a high performance aid effect.

Since the color of keys on the display keyboard is changed depending upon whether the player depressed a right key or a wrong key, the player can get feedback on his/her performance, and enjoy an improved effect of practice.

While the width of each scroll bar is constant regardless of the type of data in the illustrated embodiment, the width of each scroll bar or the tone of its color may be changed depending upon the value of the velocity data included in the note event data. This makes it possible for the apparatus to instruct subtle or elaborate expression of the song, which has been difficult to instruct by the conventional keyboard LED.

It is also possible to display a model of hands (for example, image data or line drawing of teacher's hands) on the miniature display keyboard 31. In this case, the position of the player's hands may be detected, and displayed along with the model of the hands on the miniature display keyboard 31. To detect the positions of the player's hands, a contact sensor may be provided on the keyboard 1 to detect a key that is in contact with the player's hand, or an electrostatic capacity sensor or optical sensor may be provided to detect a key to which the player's hand is getting close.

While the tempo is changed by changing the tempo factor thereby to modify the value of the timing data in the illustrated embodiment, as explained above referring to the steps S68–S70 in FIG. 9, the present invention is not limited to this method. For example, the cycle of a tempo clock for determining the tempo may be changed, or the value (count value) by which the timing data is counted in one processing may be changed.

While the illustrated embodiment is adapted such that a following portion of the automatic performance data that is to be read in advance is once stored in the advance reading buffer, and then various processes are effected while reading the data from this buffer, the present invention is not limited to this method. For example, where the CPU has high processing capability, the data to be read in advance is read in real time from the song data storage region of the RAM 7, and various processes may be conducted based on the data thus read.

While a scroll bar for a certain key is displayed with the pitch name of the key in alphabet located in the vicinity of the scroll bar in the illustrated embodiment, the syllable name in katakana (one type of Japanese writing system) may be displayed along with the scroll bar. It is also possible to display a finger number (numerical value or finger name) instead of or in addition to the syllable name or pitch name.

The demo performance based on the automatic performance data and the result of the performance rendered by the player may be superposed on each other and displayed on the piano roll paper 32, so as to show the difference between the demo performance and the player's performance. In this case, the player may enter his/her performance (performance by hands) while looking at the demo performance represented by the automatic performance data during the first reproduction of the automatic performance data, and the demo performance and the performance by hands, which are superposed on each other, may be displayed during the second reproduction of the performance data.

While an actual, physical keyboard is used as the keyboard 1 in the illustrated embodiment, a touch panel may be provided on the screen of the display device 5, instead of using the keyboard 1, and the player can directly touch the keys on the miniature display keyboard 31 and play a song concurrently with the reproduction of the automatic performance data.

Further, although in the above described embodiment a key operation region corresponding to each key of the display keyboard is displayed, which represents a period from a point of time when each key is to be depressed by the player to a point of time when the key is to be released by the player, this is not limitative. Alternatively, a key operation point (e.g. in the form of a horizontal bar) corresponding to each key of the display keyboard may be displayed, which represents timing of operation of each key, e.g. timing in which the key is to be depressed by the player, and the key operation point may be scrolled such that it approaches the display keyboard as the music piece is reproduced.

While the present invention is applied to an electronic keyboard instrument in the illustrated embodiment, the invention may be applied to other apparatus or devices, such as that in the form of a personal computer and an application program. The present invention is also applicable to such an apparatus as karaoke system.

In the illustrated embodiment, the present invention is realized in the form of the electronic keyboard instrument as shown in FIG. 1 that incorporates a tone generator device (tone generator circuit 12, effect circuit 13 and sound system 14) and an automatic performance device (CPU 5). The present invention, however, may be realized in the form of an apparatus in which these devices are provided as separate or independent devices, which are connected to each other by communication means such as an MIDI interface or various kinds of networks, for example.

While the present invention is applied to an electronic keyboard instrument in the illustrated embodiment, the invention may be applied to a piano that is not an electronic instrument.

What is claimed is:

1. A performance instructing apparatus comprising:

music piece-reproducing means for reproducing a music piece according to automatic performance data;

display means for displaying a drawing of a display keyboard such that keys of said display keyboard are arranged in the same direction as a direction in which keys of a keyboard through which a player enters pitch information are arranged with respect to the player, and for displaying a key operation region corresponding to each key of said display keyboard, said key operation region representing a period from a point of time when said each key is to be depressed by the player to a point of time when said each key is to be released by the player; and scroll means for scrolling said key operation region in a direction normal to the direction in which said keys of said display keyboard are arranged such that the region approaches said display keyboard as the music piece is reproduced by said music piece-reproducing means.

2. A performance instructing apparatus according to claim 1, further including key correctness-determining means for comparing a pitch of a key that is depressed by the player on said keyboard, with a pitch of the automatic performance data that are being reproduced, and for determining whether said pitch of the key depressed by the player coincides with said pitch of the automatic performance data, based on a result of said comparison; and wherein said key display mode-changing means changes a display mode in which a key of said display keyboard corresponding to said key that is depressed by the player, depending upon a result of said determination by said key correctness-determining means.

3. A performance instructing apparatus according to claim 2, wherein said key display mode-changing means changes color in which said key of said display keyboard is displayed.

4. A performance instructing apparatus according to claim 1, further including syllable name/pitch-name display means for displaying at least one of a syllable name and a pitch name of said each key in the vicinity of said key operation region corresponding to said each key.

5. A performance instructing apparatus according to claim 1, further including pausing means for temporarily stopping reproduction of the music piece by said music piece-reproducing means and scrolling of said key operation region by said scroll means, if the player fails to depress a key corresponding to the key operation region displayed by said display means when the key operation region has reached a corresponding key of said display keyboard, said pausing means pausing the reproduction and the scrolling until the player depresses said key.

6. A performance instructing apparatus according to claim 1, further including key operation region display mode-changing means for changing a display mode in which said key operation region is displayed, depending upon a type of said each key corresponding to said key operation region.

7. A performance instructing apparatus according to claim 6, wherein said key operation region display mode-changing means changes color in which said key operation region is displayed.

8. A performance instructing apparatus according to claim 1, further including key operation region display mode-changing means for changing a display mode in which said key operation region is displayed, depending upon whether said each key corresponding to said key operation region is to be depressed by a right hand or a left hand of the player.

9. A performance instructing apparatus according to claim 8, wherein said key operation region display mode-changing means changes color in which said key operation region is displayed.

10. A performance instructing apparatus according to claim 1, further including operation region display mode-changing means for changing a display mode in which said key operation region is displayed, depending upon a type of said automatic performance data.

11. A performance instructing apparatus according to claim 10, wherein said operation region display mode-changing means changes said display mode, depending upon velocity included in event data of said automatic performance data.

12. A performance instructing apparatus according to claim 1, wherein said music piece-reproducing means produces key-depression events relating to depression of keys of said keyboard and timing-line events representing a particular timing of performance, as the music piece is reproduced by said music piece-reproducing means; and wherein said display means comprises a display area including a predetermined number of minimum display units, said display means displaying a key depression region as said key operation region upon occurrence of each of said key-depression events, and a timing line upon occurrence of each of said timing-line events; and wherein said scroll means displays said key depression region in a first display mode in M pieces of the minimum display units located in an end portion of said display area, upon occurrence of said each key-depression event during reproduction of the music piece by said music piece-reproducing means, and displays said timing line in a second display mode in at least one (N) of said M pieces of the minimum display units, upon occurrence of said each timing-line event during reproduction by said music piece-reproducing means, while displaying the rest of said M pieces of the minimum display units in said first display mode, said scroll means shifting a predetermined display region including said end portion by an amount corresponding to said M pieces of the minimum display units per unit time and copying data in said predetermined display region into a region to which the predetermined display region is scrolled, said scroll means rewriting said at least one (N) of said M pieces of the minimum display units in said end portion, in the display mode of the minimum display units that exclude said at least one (N) of said M pieces of the minimum display units.

13. A performance instructing apparatus according to claim 5, further including number changing means for changing the number of said M pieces of the minimum display units.

14. A performance instructing apparatus comprising:

music piece-reproducing means for reproducing a music piece according to automatic performance data;

display means for displaying a drawing of a display keyboard that is oriented in the same direction as a keyboard through which a player enters pitch information, and for displaying a key operation region corresponding to each key of said display keyboard, said key operation region representing a period from a point of time when said each key is to be depressed by the player to a point of time when each key is to be released by the player; and scroll means for scrolling said key operation region such that the region approaches said display keyboard as the music piece is reproduced by said music piece-reproducing means; and key display mode-changing means for changing a display mode in which said key is displayed, when said corresponding key operation region reaches said each key of said display keyboard.

15. A performance instructing apparatus according to claim 14, wherein said key display mode-changing means changes color in which said each key is displayed.

16. A performance instructing apparatus according to claim 14, further including key correctness-determining means for comparing a pitch of a key that is depressed by the player on said keyboard, with a pitch of the automatic performance data that are being reproduced, and for determining whether said pitch of the key depressed by the player coincides with said pitch of the automatic performance data, based on a result of said comparison; and wherein said key display mode-changing means changes a display mode in which a key of said display keyboard corresponding to said key that is depressed by the player, depending upon a result of said determination by said key correctness-determining means.

17. A performance instructing apparatus according to claim 14, further including syllable name/pitch-name display means for displaying at least one of a syllable name and a pitch name of said each key in the vicinity of said key operation region corresponding to said each key.

18. A performance instructing apparatus according to claim 15, further including syllable name/pitch-name display means for displaying at least one of a syllable name and a pitch name of said each key in the vicinity of said key operation region corresponding to said each key.

19. A performance instructing apparatus according to claim 14, further including pausing means for temporarily stopping reproduction of the music piece by said music piece-reproducing means and scrolling of said key operation region by said scroll means, if the player fails to depress a key corresponding to the key operation region displayed by said display means when the key operation region has reached a corresponding key of said display keyboard, said pausing means pausing the reproduction and the scrolling until the player depresses said key.

20. A performance instructing apparatus according to claim 15, further including pausing means for temporarily stopping reproduction of the music piece by said music piece-reproducing means and scrolling of said key operation region by said scroll means, if the player fails to depress a key corresponding to the key operation region displayed by said display means when the key operation region has reached a corresponding key of said display keyboard, said pausing means pausing the reproduction and the scrolling until the player depresses said key.

21. A performance instructing apparatus according to claim 14, further including key operation region display mode-changing means for changing a display mode in which said key operation region is displayed, depending upon a type of said each key corresponding to said key operation region.

22. A performance instructing apparatus according to claim 15, further including key operation region display mode-changing means for changing a display mode in which said key operation region is displayed, depending upon a type of said each key corresponding to said key operation region.

23. A performance instructing apparatus according to claim 14, further including key operation region display mode-changing means for changing a display mode in which said key operation region is displayed, depending upon whether said each key corresponding to said key operation region is to be depressed by a right hand or a left hand of the player.

24. A performance instructing apparatus according to claim 15, further including key operation region display mode-changing means for changing a display mode in which said key operation region is displayed, depending upon whether said each key corresponding to said key operation region is to be depressed by a right hand or a left hand of the player.

25. A performance instructing apparatus according to claim 14, further including operation region display mode-changing means for changing a display mode in which said key operation region is displayed, depending upon a type of said automatic performance data.

26. A performance instructing apparatus according to claim 15, further including operation region display mode-changing means for changing a display mode in which said key operation region is displayed, depending upon a type of said automatic performance data.

27. A performance instructing apparatus according to claim 14, wherein said music piece-reproducing means produces key-depression events relating to depression of keys of said keyboard and timing-line events representing a particular timing of performance, as the music piece is reproduced by said music piece-reproducing means; and wherein said display means comprises a display area including a predetermined number of minimum display units, said display means displaying a key depression region as said key operation region upon occurrence of each of said key-depression events, and a timing line upon occurrence of each of said timing-line events; and wherein said scroll means displays said key depression region in a first display mode in M pieces of the minimum display units located in an end portion of said display area, upon occurrence of said each key-depression event during reproduction of the music piece by said music piece-reproducing means, and displays said timing line in a second display mode in at least one (N) of said M pieces of the minimum display units, upon occurrence of said each timing-line event during reproduction by said music piece-reproducing means, while displaying the rest of said M pieces of the minimum display units in said first display mode, said scroll means shifting a predetermined display region including said end portion by an amount corresponding to said M pieces of the minimum display units per unit time and copying data in said predetermined display region into a region to which the predetermined display region is scrolled, said scroll means rewriting said at least one (N) of said M pieces of the minimum display units in said end portion, in the display mode of the minimum display units that exclude said at least one (N) of said M pieces of the minimum display units.

28. A performance instructing apparatus according to claim 15, wherein said music piece-reproducing means produces key-depression events relating to depression of keys of said keyboard and timing-line events representing a particular timing of performance, as the music piece is reproduced by said music piece-reproducing means; and wherein said display means comprises a display area including a predetermined number of minimum display units, said display means displaying a key depression region as said key operation region upon occurrence of each of said key-depression events, and a timing line upon occurrence of each of said timing-line events; and wherein said scroll means displays said key depression region in a first display mode in M pieces of the minimum display units located in an end portion of said display area, upon occurrence of said each key-depression event during reproduction of the music piece by said music piece-reproducing means, and displays said timing line in a second display mode in at least one (N) of said M pieces of the minimum display units, upon occurrence of said each timing-line event during reproduction by said music piece-reproducing means, while displaying the rest of said M pieces of the minimum display units in said first display mode, said scroll means shifting a predetermined display region including said end portion by an amount corresponding to said M pieces of the minimum display units per unit time and copying data in said predetermined display region into a region to which the predetermined display region is scrolled, said scroll means rewriting said at least one (N) of said M pieces of the minimum display units in said end portion, in the display mode of the minimum display units that exclude said at least one (N) of said M pieces of the minimum display units.

29. A performance instructing method comprising:

a music piece-reproducing step of reproducing a music piece according to automatic performance data;

a display step of displaying a drawing of a display keyboard such that keys of said display keyboard are arranged in the same direction as a direction in which keys of a keyboard through which a player enters pitch information are arranged with respect to the player, and for displaying a key operation region corresponding to each key of said display keyboard, said key operation region representing a period from a point in time when said each key is to be depressed by the player to a point of time when said each key is to be released by the player; and a scroll step of scrolling said key operation region in a direction normal to the direction in which said keys of said display keyboard are arranged such that the region approaches said display keyboard as the music piece is reproduced by said music piece-reproducing step.

30. A machine readable storage medium storing a program for instructing execution of a performance instructing method comprising:

a music piece-reproducing step of reproducing a music piece according to automatic performance data;

a display step of displaying a drawing of a display keyboard that is oriented in the same direction as a keyboard through which a player enters pitch information, and for displaying a key operation region corresponding to each key of said display keyboard, said key operation region representing a period from a point of time when said each key is to be depressed by the player to a point of time when said each key is to be released by the player; and a scroll step of scrolling said key operation region such that the region approaches said display keyboard as the music piece is reproduced by said music piece-reproducing step.

31. A performance instructing apparatus comprising:

a music piece-reproducing device which reproduces a music piece according to automatic performance data;

a display which displays a drawing of a display keyboard such that keys of said display keyboard are arranged in the same direction as a direction in which keys of a keyboard through which a player enters pitch information are arranged with respect to the player, and displays a key operation region corresponding to each key of said display keyboard, said key operation region representing a period from a point of time when said each key is to be depressed by the player to a point of time when said each key is to be released by the player; and a controller which controls said display to scroll said key operation region in a direction normal to the direction in which said keys of said display keyboard are arranged such that the region approaches said display keyboard as music piece is reproduced by said music piece-reproducing device.

32. A performance instructing apparatus comprising;

a music piece-reproducing device which reproduces a music piece according to automatic performance data;

a display which displays a drawing of a display keyboard such that keys of said display keyboard are arranged in the same direction as a direction in which keys of a keyboard through which a player enters pitch information are arranged with respect to the player, and displays a key operation point corresponding to each key of said display keyboard, said key operation point representing timing in which said each key is to be operated by the player; and a controller which controls said display to scroll said key operation point in a direction normal to the direction in which said keys of said display keyboard are arranged such that point approached said display keyboard as the music piece is reproduced by said music-reproducing device.

* * * * *